US009644724B2

(12) United States Patent
    Schoolcraft

(10) Patent No.: US 9,644,724 B2
(45) Date of Patent: May 9, 2017

(54) SPLIT POWER INFINITELY VARIABLE TRANSMISSION ARCHITECTURE INCORPORATING A PLANETARY TYPE BALL VARIATOR WITH MULTIPLE FIXED RANGES

(71) Applicant: Allison Transmission, Inc., Indianapolis, IN (US)

(72) Inventor: Brian Schoolcraft, Crawfordsville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 303 days.

(21) Appl. No.: 14/517,380

(22) Filed: Oct. 17, 2014

(65) Prior Publication Data
    US 2016/0109004 A1    Apr. 21, 2016

(51) Int. Cl.
    *F16H 37/04*    (2006.01)
    *F16H 3/66*     (2006.01)
    (Continued)

(52) U.S. Cl.
    CPC ............. *F16H 37/046* (2013.01); *F16H 3/66* (2013.01); *F16H 37/086* (2013.01); *F16H 15/28* (2013.01);
    (Continued)

(58) Field of Classification Search
    None
    See application file for complete search history.

(56) References Cited

U.S. PATENT DOCUMENTS 2,347,873 A    5/1944    Bloomfield
2,410,818 A    11/1946   Grant
                         (Continued)

FOREIGN PATENT DOCUMENTS

DE    102007013493 A1    9/2008
DE    102012216277 A1    3/2014
                         (Continued)

OTHER PUBLICATIONS

International Search Report and Written Opinion received for PCT International Application No. PCT/US2013/045580, completed Oct. 27, 2013, 3 pages.
(Continued)

*Primary Examiner* — Edwin A Young
(74) *Attorney, Agent, or Firm* — Barnes & Thornburg LLP

(57) ABSTRACT

A transmission includes an input shaft, an output shaft, at least five planetary gearsets, a variable-ratio unit, and at least five clutches. The at least five clutches are selectively engageable in combination with one another to select one of a plurality of operating modes including at least one reverse mode, at least five forward modes, and at least five transition modes. One of the at least five transition modes is configured to transition the transmission from the at least one reverse mode to one of the at least five forward modes. Another one of the at least five transition modes is configured to transition the transmission from the one of the at least five forward modes to another of the at least five forward modes. Each of the at least five transition modes includes a fixed speed ratio defined between the input shaft and the output shaft.

20 Claims, 24 Drawing Sheets

(51) Int. Cl.
*F16H 37/08* (2006.01)
*F16H 15/28* (2006.01)

(52) U.S. Cl.
CPC .......... *F16H 2037/0873* (2013.01); *F16H 2037/0893* (2013.01); *F16H 2200/2015* (2013.01); *F16H 2200/2046* (2013.01); *F16H 2200/2097* (2013.01)

(56) References Cited

U.S. PATENT DOCUMENTS

| | | |
|---|---|---|
| 2,554,221 A | 5/1951 | Stephenson et al. |
| 2,583,843 A | 1/1952 | Herrick |
| 2,596,654 A | 5/1952 | Clark et al. |
| 2,718,292 A | 9/1955 | Meilander et al. |
| 2,841,330 A | 7/1958 | Brewer et al. |
| 3,324,744 A | 6/1967 | Roper |
| 3,410,157 A | 11/1968 | Livezey |
| 3,432,016 A | 3/1969 | Vogt |
| 3,481,436 A | 12/1969 | Wilkowski |
| 3,631,741 A | 1/1972 | Kelbel |
| 4,004,473 A | 1/1977 | Pearce et al. |
| 4,107,776 A | 8/1978 | Beale |
| 4,114,478 A | 9/1978 | Clauss |
| 4,205,563 A | 6/1980 | Gorrell |
| 4,258,585 A | 3/1981 | Orshansky, Jr. et al. |
| 4,361,217 A | 11/1982 | Bieber et al. |
| 4,381,828 A | 5/1983 | Lunn et al. |
| 4,742,733 A | 5/1988 | Schreiner |
| 4,754,664 A | 7/1988 | Dick |
| 4,813,524 A | 3/1989 | Reik |
| 4,856,374 A | 8/1989 | Kreuzer |
| 4,950,208 A | 8/1990 | Tomlinson |
| 5,011,463 A | 4/1991 | Jarchow et al. |
| 5,062,050 A | 10/1991 | Petzold et al. |
| 5,152,726 A | 10/1992 | Lederman |
| 5,355,981 A | 10/1994 | Itoh et al. |
| 5,407,024 A | 4/1995 | Watson et al. |
| 5,441,130 A | 8/1995 | Ha |
| 5,538,121 A | 7/1996 | Hering |
| 5,584,776 A | 12/1996 | Weilant et al. |
| 5,653,322 A | 8/1997 | Vasa et al. |
| 5,662,198 A | 9/1997 | Kojima et al. |
| 5,704,867 A | 1/1998 | Bowen |
| 5,771,477 A | 6/1998 | Showalter et al. |
| 5,833,566 A | 11/1998 | Showalter |
| 5,884,526 A | 3/1999 | Fogelberg |
| 5,893,812 A | 4/1999 | Narai et al. |
| 5,918,715 A | 7/1999 | Ruth et al. |
| 5,992,592 A | 11/1999 | Showalter |
| 6,062,361 A | 5/2000 | Showalter |
| 6,149,540 A | 11/2000 | Johnson et al. |
| 6,149,543 A | 11/2000 | Breen |
| 6,155,395 A | 12/2000 | Braford |
| 6,251,045 B1 | 6/2001 | Oliveira et al. |
| 6,301,538 B1 | 10/2001 | Kirchhoffer et al. |
| 6,358,178 B1 | 3/2002 | Wittkopp |
| 6,394,925 B1 | 5/2002 | Wontner et al. |
| 6,460,671 B1 | 10/2002 | Karambelas et al. |
| 6,585,619 B2 | 7/2003 | Henzler et al. |
| 6,588,559 B2 | 7/2003 | Blair |
| 6,672,442 B2 | 1/2004 | Kato et al. |
| 6,679,367 B2 | 1/2004 | Baker et al. |
| 6,719,659 B2 | 4/2004 | Geiberger et al. |
| 6,726,590 B2 | 4/2004 | Henzler et al. |
| 6,761,658 B1 | 7/2004 | Stettler, Jr. |
| 6,790,153 B2 | 9/2004 | Goto |
| 6,834,750 B2 | 12/2004 | Baker et al. |
| 6,846,257 B2 | 1/2005 | Baker et al. |
| 6,855,086 B2 | 2/2005 | Elser et al. |
| 6,949,045 B2 | 9/2005 | Wafzig et al. |
| 7,052,430 B2 | 5/2006 | Stevenson et al. |
| 7,189,182 B2 | 3/2007 | Stevenson et al. |
| 7,195,576 B2 | 3/2007 | Toyoda et al. |
| 7,204,337 B2 | 4/2007 | Wildfellner |
| 7,217,216 B2 | 5/2007 | Inoue |
| 7,219,569 B2 | 5/2007 | Jastrzembowski et al. |
| 7,326,146 B2 | 2/2008 | Miyata et al. |
| 7,347,801 B2 | 3/2008 | Guenter et al. |
| 7,407,459 B2 | 8/2008 | Greenwood et al. |
| 8,083,631 B2 | 12/2011 | Shiohara |
| 8,142,323 B2 | 3/2012 | Tsuchiya et al. |
| 8,152,673 B2 | 4/2012 | Yanay |
| 8,298,111 B2 | 10/2012 | Kato et al. |
| 8,298,112 B2 | 10/2012 | Takada |
| 8,617,020 B2 | 12/2013 | Winter |
| 8,758,181 B2 | 6/2014 | Calvert |
| 8,845,477 B2 | 9/2014 | Koch et al. |
| 8,986,150 B2 | 3/2015 | Versteyhe et al. |
| 8,996,263 B2 | 3/2015 | Quinn, Jr. et al. |
| 9,133,924 B2 | 9/2015 | Schoolcraft |
| 9,163,705 B1 | 10/2015 | Hwang et al. |
| 2002/0005325 A1 | 1/2002 | Yamada |
| 2003/0051959 A1 | 3/2003 | Blair |
| 2003/0199353 A1 | 10/2003 | Bowen |
| 2003/0226415 A1 | 12/2003 | Baker et al. |
| 2004/0104096 A1 | 6/2004 | Genise |
| 2006/0025272 A1 | 2/2006 | Pelouch |
| 2006/0189435 A1 | 8/2006 | Flaig et al. |
| 2007/0272455 A1 | 11/2007 | Lang et al. |
| 2007/0287572 A1 | 12/2007 | Tabata et al. |
| 2008/0280722 A1 | 11/2008 | Phillips et al. |
| 2009/0118912 A1 | 5/2009 | Hugenroth et al. |
| 2009/0203486 A1 | 8/2009 | Murray |
| 2009/0253543 A1 | 10/2009 | Foster et al. |
| 2010/0093479 A1 | 4/2010 | Carter et al. |
| 2010/0151984 A1 | 6/2010 | Viitasalo et al. |
| 2011/0111910 A1 | 5/2011 | Ideshio et al. |
| 2011/0144872 A1 | 6/2011 | Long et al. |
| 2011/0300983 A1 | 12/2011 | Kurokawa |
| 2012/0072084 A1 | 3/2012 | Stoller et al. |
| 2013/0018557 A1* | 1/2013 | Wilson ............... F16H 61/06 701/67 |
| 2013/0338888 A1 | 12/2013 | Long et al. |
| 2013/0338889 A1 | 12/2013 | Long et al. |
| 2013/0338893 A1 | 12/2013 | Long et al. |
| 2014/0038766 A1* | 2/2014 | Koch ............... F16H 3/66 475/276 |
| 2014/0262672 A1 | 9/2014 | Raszkowski et al. |
| 2014/0274540 A1 | 9/2014 | Schoolcraft |

FOREIGN PATENT DOCUMENTS

| | | |
|---|---|---|
| EP | 1519084 A2 | 9/2004 |
| EP | 2113056 A1 | 11/2009 |
| JP | 2007232125 A | 9/2007 |
| JP | 2008075706 A | 4/2008 |
| WO | 9849455 A2 | 11/1998 |
| WO | 2010048029 A2 | 4/2010 |
| WO | 2013095213 A1 | 6/2013 |
| WO | 2014039900 | 3/2014 |
| WO | 2014125050 | 8/2014 |

OTHER PUBLICATIONS

U.S. Appl. No. 61/660,666, dated Dec. 16, 2009, (31 pages).
Utility U.S. Appl. No. 14/517,400, dated Oct. 17, 2014.
Utility U.S. Appl. No. 14/517,374, dated Oct. 17, 2014.
Utility U.S. Appl. No. 14/517,364, dated Oct. 17, 2014.
Utility U.S. Appl. No. 14/517,410, dated Oct. 17, 2014.
Utility U.S. Appl. No. 14/517,426, dated Oct. 17, 2014.
Search Report and Written Opinion from the International Searching Authority for Application No. PCT/US2015/056009, dated Feb. 25, 2016, 13 pages.
Search Report and Written Opinion for Application No. PCT/US2015/055999, dated Dec. 4, 2015, 10 pages.
Search Report and Written Opinion for Application No. PCT/US2015/055996, dated Jan. 4, 2016, 7 pages.
Search Report and Written Opinion for Application No. PCT/US2015/055993, dated Jan. 6, 2016, 8 pages.
Search Report and Written Opinion for Application No. PCT/US2015/056003, dated Jan. 6, 2016, 8 pages.

(56) References Cited

OTHER PUBLICATIONS

Search Report and Written Opinion for Application No. PCT/US2015/056007, dated Jan. 28, 2016, 8 pages.

* cited by examiner

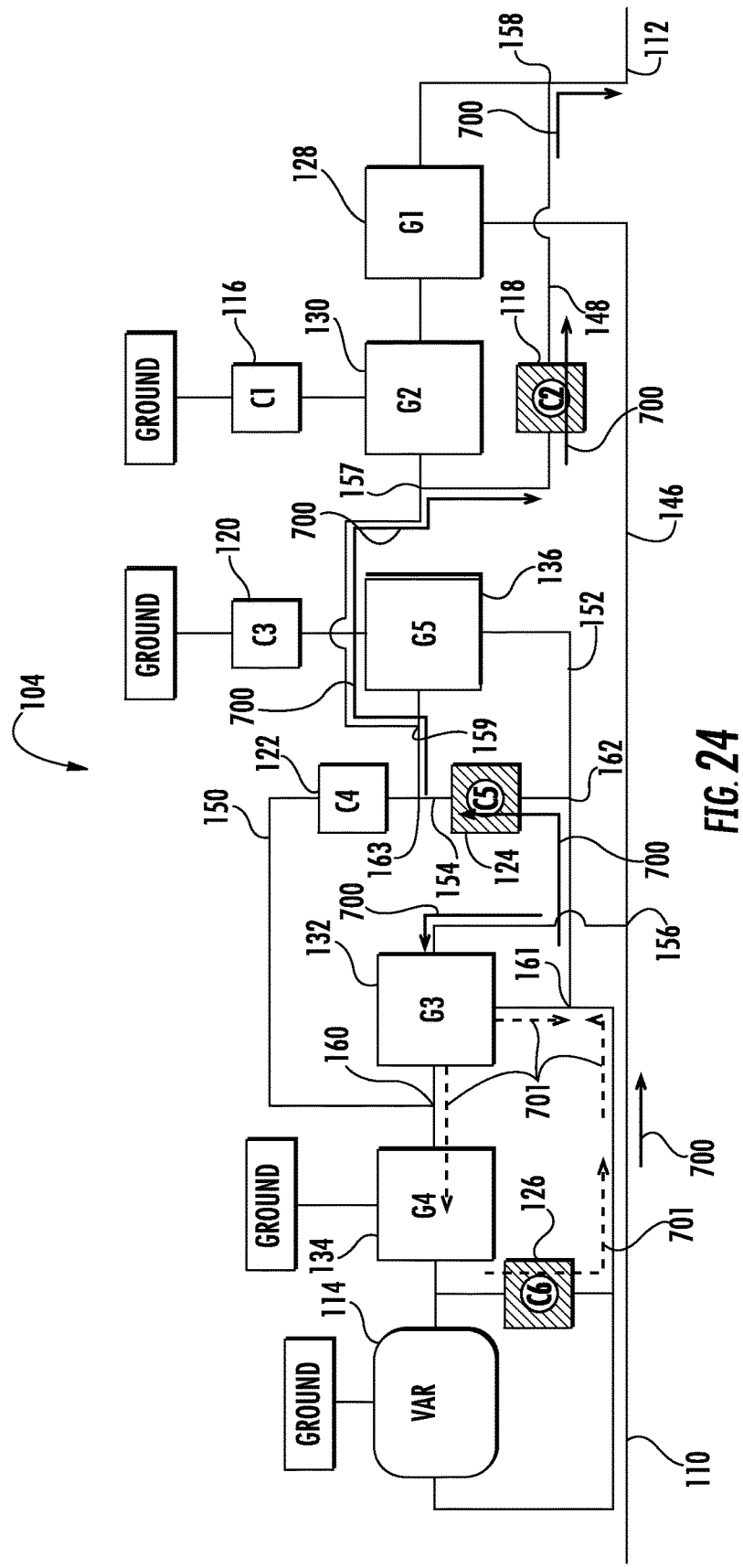

SPLIT POWER INFINITELY VARIABLE TRANSMISSION ARCHITECTURE INCORPORATING A PLANETARY TYPE BALL VARIATOR WITH MULTIPLE FIXED RANGES

CROSS-REFERENCE TO RELATED APPLICATION

Cross-reference is made to co-pending U.S. patent application Ser. No. 14/517,426, entitled "Split Power Infinitely Variable Transmission Architecture Incorporating a Planetary Type Ball Variator with Multiple Fixed Ranges," which was filed by Brian Schoolcraft and is incorporated herein by reference.

TECHNICAL FIELD

The present disclosure relates generally to infinitely variable transmissions, and more particularly, to the architectures of infinitely variable transmissions including ratio varying units.

BACKGROUND

Continuously variable transmissions (CVTs) utilize a ratio varying unit (e.g., a "variator") to provide a continuous variation of transmission ratio rather than a series of predetermined ratios as provided in typical transmissions. The variator of a typical CVT is coupled between the transmission input and the transmission output via gearing and one or more clutches.

In one type of continuously variable transmission, commonly referred to as an infinitely variable transmission (IVT), a zero output speed can be obtained independently of the rotational input speed provided to the transmission by the drive unit in a geared neutral mode. Infinitely variable transmissions may use a variator and a planetary gear train to direct power flow along multiple power paths. For instance, power may flow along a first path through the variator and along a second path through the planetary gear train. Power may also be recirculated to the variator, thereby increasing the load experienced by the variator during the operation of the infinitely variable transmission. Many current architectures for infinitely variable transmissions subject the variator to the entire power load recirculated through the infinitely variable transmission.

SUMMARY

According to one aspect of the present disclosure, a transmission includes an input shaft, an output shaft, at least five planetary gearsets arranged between the input shaft and the output shaft, a variable-ratio unit arranged between the input shaft and the output shaft, and at least five clutches arranged between the input shaft and the output shaft. The input shaft is configured to receive torque from a drive unit. The output shaft is configured to transmit torque to a load. The at least five clutches are selectively engageable in combination with one another to select one of a plurality of operating modes including at least one reverse mode in which torque output by the output shaft has one direction, at least five forward modes in which torque output by the output shaft has another direction opposite the one direction, and at least five transition modes. One of the at least five transition modes is configured to transition the transmission from the at least one reverse mode to one of the at least five forward modes. Another one of the at least five transition modes is configured to transition the transmission from the one of the at least five forward modes to another of at the at least five forward modes. Each of the at least five transition modes includes a fixed speed ratio defined between the input shaft and the output shaft.

In some embodiments, (i) the at least five planetary gearsets may comprise only five planetary gearsets, and (ii) the at least five clutches may comprise only five clutches. In some embodiments, (i) the at least one reverse mode may comprise only one reverse mode, (ii) the at least five forward modes may comprise only five forward modes, and (iii) the at least five transition modes may comprise only five transition modes.

In some embodiments, the transmission may be configured to engage at least three of the at least five clutches in each of the at least five transition modes. The at least three clutches may comprise only three clutches. In some embodiments, the transmission may be configured to engage at least two of the at least five clutches in each of (i) the at least one reverse operating mode and (ii) the at least five forward operating modes. The at least two clutches may comprise only two clutches.

In some embodiments, (i) the transmission may be operable to provide a first plurality of input speeds at the input shaft and a second plurality of output speeds at the output shaft, and (ii) the plurality of operating modes may include at least one mode in which one of the second plurality of output speeds is equal to zero for the first plurality of input speeds. The plurality of operating modes may include three modes in which one of the second plurality of output speeds is equal to zero for the first plurality of input speeds.

In some embodiments, (i) the variable-ratio unit may have an input and an output, and (ii) the input of the variable-ratio unit may be coaxial with the output of the variable-ratio unit. When the transmission receives torque from the drive unit, the angular velocity of the input of the variable-ratio unit may have the same direction as the angular velocity of the output of the variable-ratio unit.

According to another aspect of the present disclosure, a transmission includes a housing, an input shaft, an output shaft, a variable-ratio unit arranged between the input shaft and the output shaft, at least five planetary gearsets arranged between the input shaft and the output shaft, and at least five clutches arranged between the input shaft and the output shaft. The input shaft is configured to receive torque from a drive unit. The output shaft is configured to transmit torque to a load. The variable-ratio unit is configured to output torque from an input of the variable-ratio unit to an output of the variable-ratio unit. The at least five planetary gearsets include (i) a first planetary gearset coupled to the input shaft and the variable-ratio unit and (ii) a second planetary gearset coupled to the first planetary gearset, the variable-ratio unit, and the housing. The at least five clutches are selectively engageable in combination with one another to select one of a plurality of operating modes including at least one reverse mode in which torque output by the output shaft has one direction and at least five forward modes in which torque output by the output shaft has another direction opposite the one direction.

In some embodiments, the input of the variable-ratio unit may be coaxial with the output of the variable-ratio unit. In some embodiments, each of the first and second planetary gearsets may include an idler gear. In some embodiments, (i) a ring gear of the first planetary gearset may be coupled to the input shaft, and (ii) a carrier of the first planetary gearset may be coupled to the input of the variable-ratio unit.

In some embodiments, (i) a ring gear of the second planetary gearset may be coupled to a sun gear of the first planetary gearset, (ii) a sun gear of the second planetary gearset may be coupled to the output of the variable-ratio unit, and (iii) a carrier of the second planetary gearset may be coupled to the housing. In some embodiments, a third planetary gearset of the at least five planetary gearsets may be coupled to (i) the output shaft and (ii) the first planetary gearset.

In some embodiments, (i) a carrier of a third planetary gearset of the at least five planetary gearsets may be coupled to the output shaft, and (ii) a sun gear of the third planetary gearset may be coupled to a ring gear of the first planetary gearset through the input shaft. In some embodiments, a ring gear of a third planetary gearset of the at least five planetary gearsets may be coupled to a ring gear of a fourth planetary gearset of the at least five planetary gearsets.

According to another aspect of the present disclosure, a transmission includes an input shaft, an output shaft, at least five planetary gearsets arranged between the input shaft and the output shaft, a variable-ratio unit arranged between the input shaft and the output shaft, and at least five clutches arranged between the input shaft and the output shaft. The input shaft is configured to receive torque from a drive unit. The output shaft is configured to transmit torque to a load. The at least five clutches are selectively engageable in combination with one another to select one of a plurality of operating modes including at least one continuously-variable reverse mode in which torque output by the output shaft has one direction, at least five continuously-variable forward modes in which torque output by the output shaft has another direction opposite the one direction, and a least five transition modes configured to transition the transmission from the at least one continuously-variable reverse mode to one of the at least five continuously-variable forward modes and from the one of the at least five continuously-variable forward modes to another of the at least five continuously-variable forward modes. The transmission is configured to provide (i) a range of speed ratios defined between the input shaft and the output shaft in each of the at least one continuously-variable reverse mode and the at least five continuously-variable forward modes, and (ii) a fixed speed ratio defined between the input shaft and the output shaft in each of the at least five transition modes. The range of speed ratios defined in each of the at least one continuously-variable reverse mode and the at least five continuously-variable forward modes overlaps with the fixed speed ratio defined in one of the at least five transition modes.

According to another aspect of the present disclosure, a transmission is operable in a plurality of operating modes and comprises an input shaft, a plurality of gearsets, a variable-ratio unit, and a plurality of torque-transmitting mechanisms. The input shaft is configured to receive torque from a drive unit and transmit the torque to an output shaft of the transmission. The plurality of gearsets is arranged between the input shaft and the output shaft. The plurality of gearsets includes a first planetary gearset, a second planetary gearset, and a third planetary gearset. Each of the planetary gearsets includes a sun gear, a ring gear, a carrier, and a plurality of planet gears. The variable-ratio unit is operable to produce continuously-variable torque output, and the variable-ratio unit includes an input ring coupled to the carrier of the first planetary gearset and an output ring coupled to the sun gear of the second planetary gearset. The plurality of torque transmitting mechanisms includes a variator bypass clutch, a first clutch, and a second clutch. The variator bypass clutch is engageable to bypass the variable-ratio unit to prevent continuously-variable torque output from being produced in at least one operating mode of the transmission. The first clutch is engageable to couple the carrier of the first planetary gearset to the carrier of the third planetary gearset. The second clutch is engageable to couple the ring gear of the second planetary gearset to the carrier of the third planetary gearset.

In some embodiments, the variator bypass clutch may be engageable to couple the input ring of the variable-ratio unit to the output ring of the variable-ratio unit to bypass the variable-ratio unit. The carrier of the first planetary gearset may be coupled to the sun gear of the third planetary gearset. The sun gear of the first planetary gearset may be coupled to the ring gear of the second planetary gearset. The ring gear of the first planetary gearset may be coupled to the input shaft.

In some embodiments, the transmission may comprise a transmission housing and a third clutch. The third clutch may be engageable to couple the ring gear of the third planetary gearset to the transmission housing to brake the ring gear of the third planetary gearset.

In some embodiments, the transmission may comprise a fourth planetary gearset. The fourth planetary gearset may include a sun gear, a ring gear, a carrier, and a plurality of planet gears. The carrier of the third planetary gearset may be coupled to the sun gear of the fourth planetary gearset.

In some embodiments, the transmission may comprise a fourth clutch. The fourth clutch may be engageable to couple the carrier of the fourth planetary gearset to the transmission housing to brake the carrier of the fourth planetary gearset.

In some embodiments, the transmission may comprise a fifth planetary gearset. The fifth planetary gearset may include a sun gear, a ring gear, a carrier, and a plurality of planet gears. The ring gear of the fifth planetary gearset may be coupled to the ring gear of the fourth planetary gearset.

In some embodiments, the transmission may comprise a fifth clutch. The fifth clutch may be engageable to couple the carrier of the third planetary gearset to the carrier of the fifth planetary gearset.

According to another aspect of the present disclosure, a transmission is operable in a plurality of operating modes and comprises an input shaft, a plurality of gearsets, a variable-ratio unit, and a plurality of torque transmitting mechanisms. The input shaft is configured to receive torque from a drive unit and transmit the torque to an output shaft of the transmission. The plurality of gearsets is arranged between the input shaft and the output shaft. The plurality of gearsets includes a first planetary gearset, a second planetary gearset, a third planetary gearset, a fourth planetary gearset, and a fifth planetary gearset. Each of the planetary gearsets includes a sun gear, a ring gear, a carrier, and a plurality of planet gears. The variable-ratio unit is operable to produce continuously-variable torque output, and the variable-ratio unit includes an input ring coupled to the carrier of the first planetary gearset and an output ring coupled to the sun gear of the second planetary gearset. The plurality of torque transmitting mechanisms includes a variator bypass clutch and a first clutch. The variator bypass clutch is engageable to bypass the variable-ratio unit to prevent continuously-variable torque output from being produced in at least one operating mode of the transmission. The first clutch is engageable to couple both the carrier of the third planetary gearset and the carrier of the fourth planetary gearset to the carrier of the fifth planetary gearset.

In some embodiments, at least one of the planetary gearsets may include an idler-planet gear. In some embodiments, at least two of the planetary gearsets may each include an idler-planet gear.

In some embodiments, the transmission may comprise a transmission housing. The carrier of the second planetary gearset may be coupled to the transmission housing to brake the carrier of the second planetary gearset.

In some embodiments, each component of at least one of the planetary gearsets is configured to rotate. In some embodiments, each component of at least two of the planetary gearsets is configured to rotate.

In some embodiments, the transmission may comprise a second clutch. The second clutch may be engageable to couple the ring gear of the third planetary gearset to the transmission housing to brake the ring gear of the third planetary gearset. The transmission may comprise a third clutch. The third clutch may be engageable to couple the ring gear of the fourth planetary gearset to the transmission housing to brake the ring gear of the fourth planetary gearset. The sun gear of the fourth planetary gearset may be coupled to the ring gear of the fifth planetary gearset. The carrier of the fifth planetary gearset may be coupled to the output shaft.

According to another aspect of the present disclosure, a transmission is operable in a plurality of operating modes and comprises an input shaft, a plurality of gearsets, a variable-ratio unit, and a plurality of torque transmitting mechanisms. The input shaft is configured to receive torque from a drive unit and transmit the torque to an output shaft of the transmission. The plurality of gearsets is arranged between the input shaft and the output shaft. The plurality of gearsets includes a first planetary gearset, a second planetary gearset, a third planetary gearset, a fourth planetary gearset, and a fifth planetary gearset. Each of the planetary gearsets includes a sun gear, a ring gear, a carrier, and a plurality of planet gears. The variable-ratio is operable to produce continuously-variable torque output, and the variable ratio-unit includes an input ring coupled to the carrier of the first planetary gearset and an output ring coupled to the sun gear of the second planetary gearset. The plurality of torque transmitting mechanisms includes a variator bypass clutch and a first clutch. The variator bypass clutch is engageable to bypass the variable-ratio unit to prevent continuously-variable torque output from being produced in at least one operating mode of the transmission. The first clutch is engageable to couple the carrier of the fourth planetary gearset to the output shaft through the ring gear of the fifth planetary gearset.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 24 is a block diagrammatic view of the infinitely variable transmission of FIG. 3 showing power flow therethrough in a sixth variator bypass operating mode.

DETAILED DESCRIPTION OF THE DRAWINGS

Figure 1:
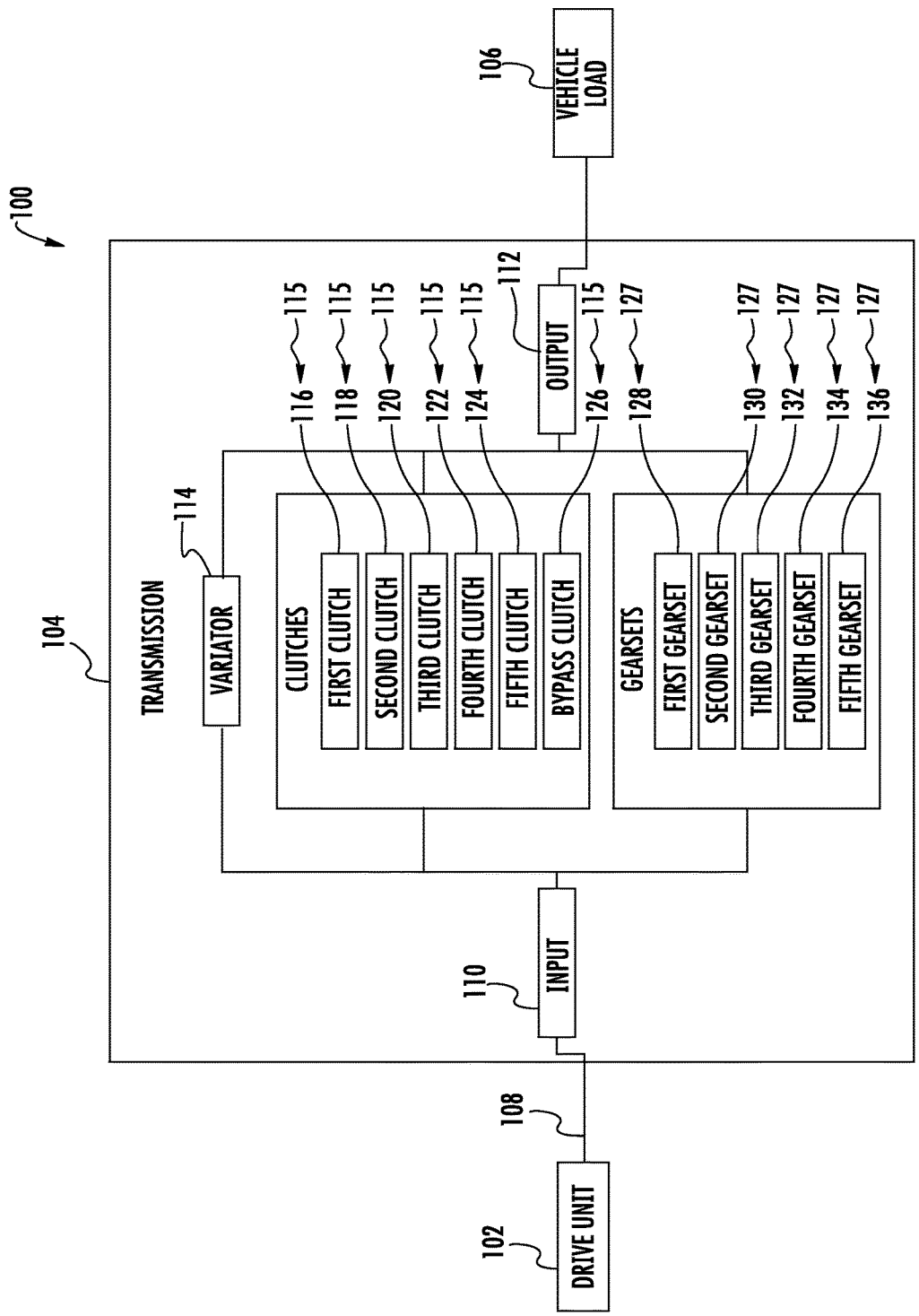
FIG. 1 is a simplified block diagram of an infinitely variable transmission including a variator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative motor vehicle 100 includes a drive unit 102, a transmission 104 coupled to the drive unit 102, and a vehicle load 106 coupled to the transmission 104. The drive unit 102 may be embodied as any type of motor or internal combustion engine having a reciprocating or a rotary configuration that provides rotational power to the transmission 104 and therethrough to the vehicle load 106. For instance, the drive unit 102 may be embodied as a four-stroke piston engine, a diesel engine, or a rotary engine. The vehicle load 106 may be embodied as, or otherwise include, drive wheels, caterpillar tracks, propels, etc. that impart the motor vehicle 100 with locomotion when driven by the drive unit 102 via the transmission 104. Additionally, the vehicle load 106 may be embodied as an auxiliary gearbox (e.g. a transfer case or drop box) or a power take-off device, such as a pump, mixer, lifter, shoveler, compressor, compactor, or blower.

In use, rotational power generated by the drive unit 102 is transmitted to the transmission 104 via a drive unit output shaft 108 included in the drive unit 102. The drive unit output shaft 108 is coupled to a transmission input shaft 110 included in the transmission 104. Additionally, rotational power received by the transmission 104 at the input shaft 110 is transmitted to a transmission output shaft 112 and therefrom to the vehicle load 106.

The transmission 104 ensures the controlled application of rotational power generated by the drive unit 102 to the vehicle load 106. The transmission 104, as discussed in more detail below, includes a plurality of gearsets that enable speed and torque generated by the drive unit 102 to be converted for use by the vehicle load 106.

The transmission 104 is operable in a plurality of operating modes to transmit rotational power supplied by the drive unit 102 from the transmission input shaft 110 to the transmission output shaft 112. Each operating mode enables at least one ratio of input speed (i.e., at the transmission input shaft 110) to output speed (i.e., at the transmission output shaft 112) to be achieved. As discussed below, operating modes of the transmission 104 in which a variator 114 is utilized enable a range of transmission ratios to be achieved whereas operating modes in which the variator 114 is not utilized enable only a single transmission ratio to be achieved.

The transmission 104 of FIG. 1 is illustratively embodied as an infinitely variable transmission. The transmission 104 includes the variator 114, a plurality of clutches 115, and a plurality of gearsets 127 in addition to the input shaft 110 and the output shaft 112. Illustratively, the plurality of clutches 115 includes a first clutch 116, a second clutch 118, a third clutch 120, a fourth clutch 122, a fifth clutch 124, and a variator bypass clutch 126. Additionally, the illustrative plurality of gearsets 127 includes a first gearset 128, a second gearset 130, a third gearset 132, a fourth gearset 134, and a fifth gearset 136.

The infinitely variable transmission 104 is operable, as discussed below, to split rotational power supplied from the drive unit 102 between the variator 114 and the plurality of gearsets 127. The transmission 104 is also operable, in at least one operating mode, to achieve zero output speed at the output shaft 112 in a mode referred herein to as a "geared neutral mode." The transmission 104 is further operable to recirculate rotational power directed toward the output shaft 112 back toward the input shaft 110 in multiple operating modes. As discussed below, power recirculated back toward the input shaft 110 and received by the variator 114 is reduced as a result of the architecture of the infinitely variable transmission 104. In this manner, the infinitely variable transmission 104 is similar to the infinitely variable transmission disclosed in U.S. Provisional Patent App. Ser. No. 61/798,476 entitled "SPLIT POWER INFINITELY VARIABLE TRANSMISSION ARCHITECTURE" by Brian Schoolcraft, the entirety of which is hereby incorporated by reference.

The variator 114, the plurality of clutches 115, and the plurality of gearsets 127 included in the transmission 104 are arranged between the input shaft 110 and the output shaft 112 of the transmission 104. Each of the gearsets included in the plurality of gearsets 127 may be supported by a mainshaft of the transmission 104 and may be capable of rotating freely and independently thereof. Each of the clutches may be selectively engaged to transmit power along a particular path between components included in the transmission 104 as discussed below.

Each of the plurality of clutches 115 included in the transmission 104 is embodied as a torque-transmitting device configured to define a torque transfer path between components included in the transmission 104. By selectively engaging each of the plurality of clutches 115 in combination with one another, the plurality of clutches 115 define a torque transfer path between the input shaft 110 and the output shaft 112 and thereby effect a change from one operating mode to another. In one example, one or more of the plurality of clutches 115 may be embodied as a three-position dog clutch such as the three-position dog clutch disclosed in U.S. Provisional Patent App. Ser. No. 61/799,200 entitled "THREE-POSITION DOG CLUTCH" by Brian Schoolcraft, the entirety of which is hereby incorporated by reference. In other embodiments, one or more of the plurality of clutches 115 may be embodied as multi-plate wet clutches or controllable mechanical diodes, the engagement/disengagement of which are used to accomplish changes between operating modes. As discussed below, in the illustrative embodiment, the second clutch 118, the fourth clutch 122, the fifth clutch 124, and the variator bypass clutch 126 are rotating clutches while the first clutch 116 and the third clutch 120 are stationary, non-rotating clutches. Additionally, the variator bypass clutch 126, as discussed below, is engageable to lock a variator input ring 138 to a variator output ring 142 so that the variator 114 achieves a 1:1 ratio (i.e., variator input speed is equal to variator output speed). When the variator bypass clutch 126 is engaged, the power load experienced by the variator 114 is removed, and all the power transmitted to the variator 114 flows instead through the variator bypass clutch 126.

Figure 2:
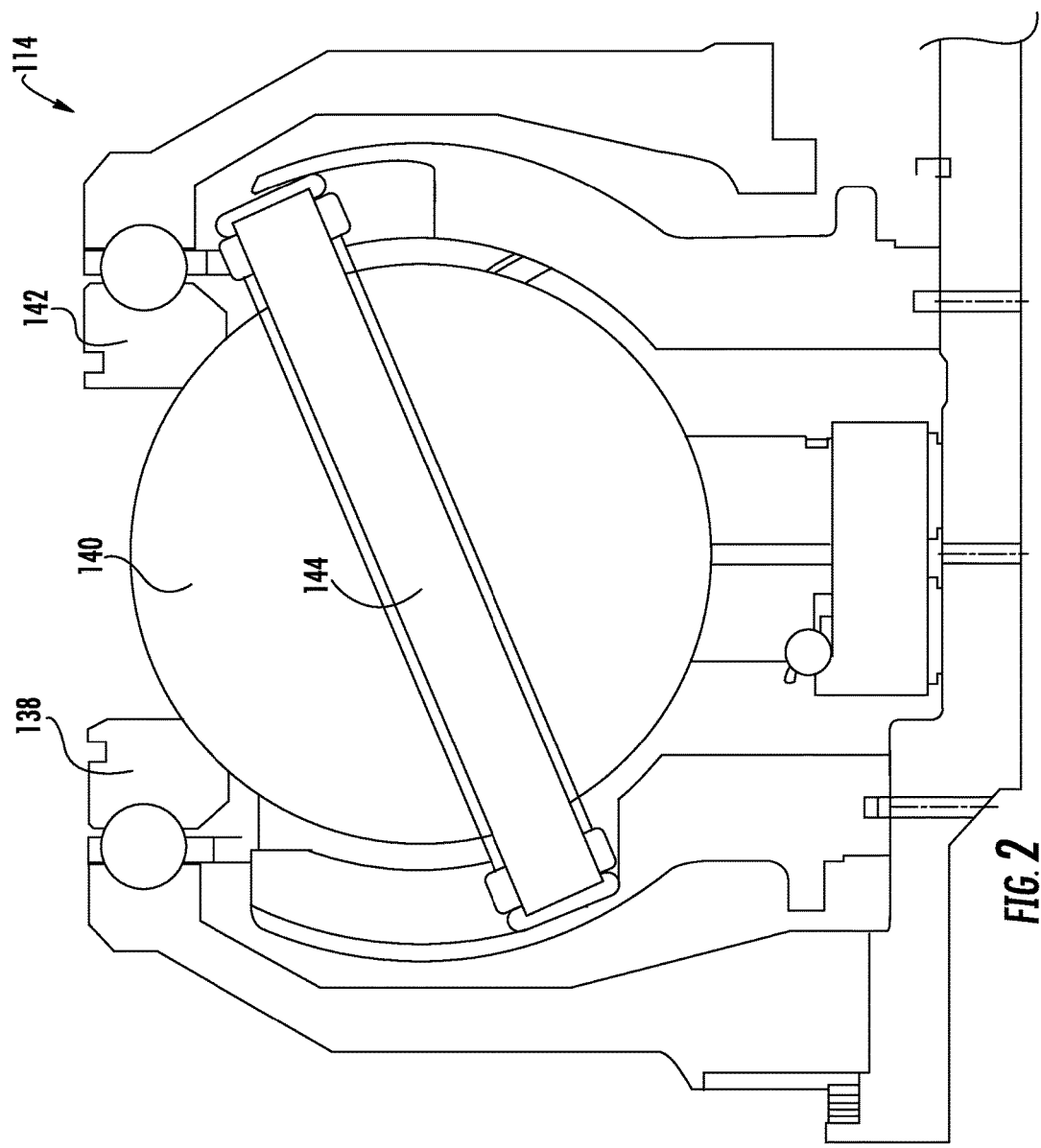
FIG. 2 is a side elevation view of the variator of the infinitely variable transmission of FIG. 1.

Referring now to FIG. 2, in the illustrative embodiment, the variator 114 is embodied as a planetary-type ball variator and includes the input ring 138 and the output ring 142. Each of the variator rings 138, 142 are spaced apart as shown in FIG. 2 to permit a ball 140 to be positioned between the rings 138, 142. The ball 140 is configured to tilt between the rings 138, 142 to vary the ratio achieved using the variator 114. An axle 144 encircles the ball 140 as shown in FIG. 2. The ball 140 is tilted by continuously tilting the axle 144 so that continuously-variable torque output is produced using the variator 114. In the illustrative embodiment, the input ring 138 is coaxial with the output ring 142. In addition, torque received at the input ring 138 has the same direction (i.e., counterclockwise or clockwise) as torque output from the output ring 142, and the angular velocity of the input ring 138 has the same direction as the angular velocity of the output ring 142.

Figure 3:
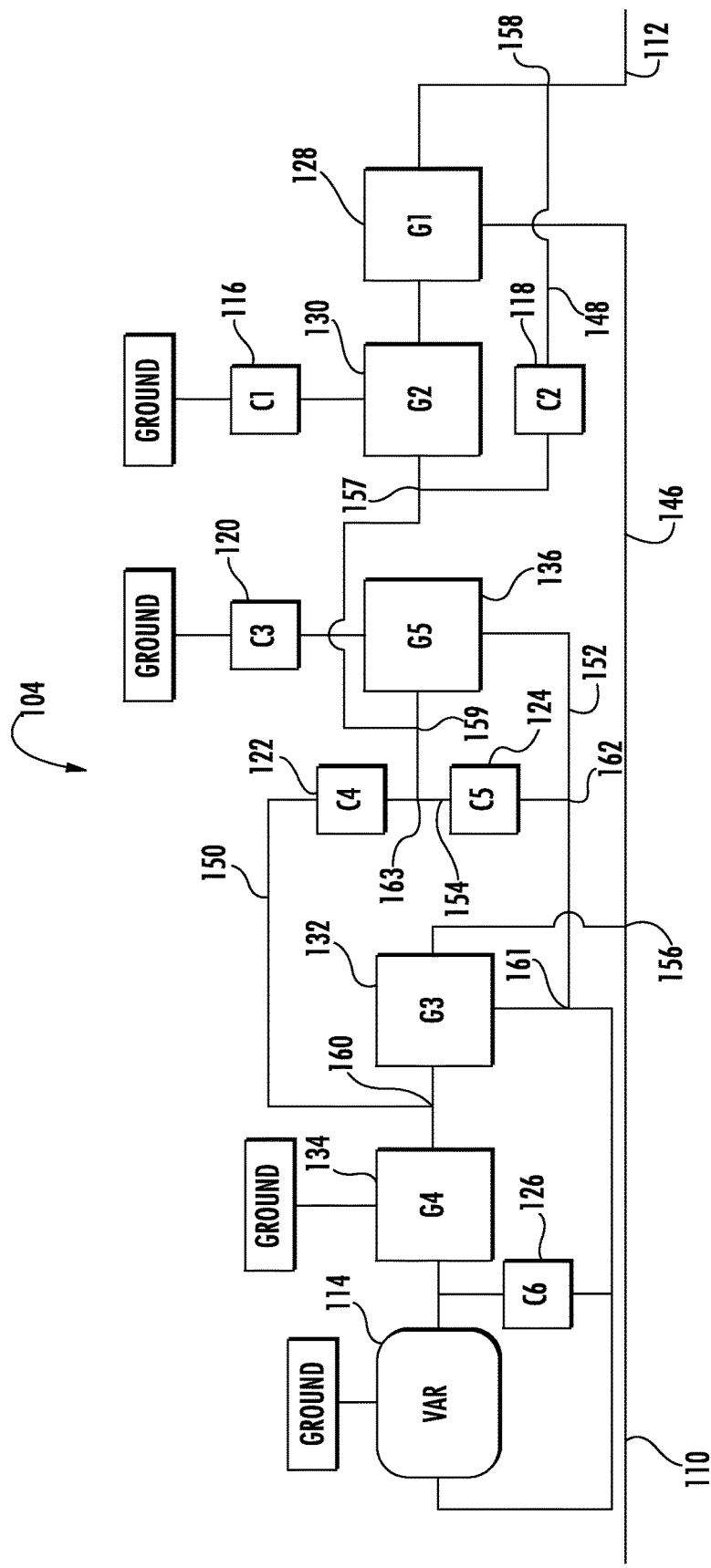
FIG. 3 is a block diagrammatic view of the architecture of the infinitely variable transmission of FIG. 1 showing various components included in the infinitely variable transmission.

Referring now to FIG. 3, the architecture of the transmission 104 is shown in which each gearset of the plurality of gearsets 127 is represented by a corresponding box (i.e., G1, G2, G3, G4, and G5) and the variator 114 is designated as "VAR." G1 designates the first gearset 128, G2 designates the second gearset 130, G3 designates the third gearset 132, G4 designates the fourth gearset 134, and G5 designates the fifth gearset 136. Each clutch of the plurality of clutches 115 is also represented by a box such that the following designations apply: C1 (the first clutch 116), C2 (the second clutch 118), C3 (the third clutch 120), C4 (the fourth clutch 122), C5 (the fifth clutch 124), and C6 (the variator bypass clutch 126).

It should be appreciated that the architecture of the transmission 104 defines a plurality of power paths along which power may be transmitted between components included in the transmission 104 during one or more operational modes. In the illustrative embodiments, the plurality of power paths defined by the architecture of the transmission 104 includes a power path 146, a power path 148, a power path 150, a power path 152, and a power path 154. As illustrated in FIGS. 8-24, power flow along the power path 146 is bi-directional in the plurality of operating modes of the transmission 104, and power flow along the power path 148 is uni-directional in the plurality of operating modes of the transmission 104. In each operating mode of the transmission 104, power is transmitted between the input shaft 110 and the output shaft 112 along at least one of (i) the power paths 146, 148 or (ii) the power paths 150, 152, 154.

In the illustrative embodiment, the power path 146 is defined by a junction 156, the first gearset 128, the second gearset 130, the first clutch 116, and a junction 158. The input side of the power path 146 is defined at the junction 156. The junction 156 may be embodied as a coupling permitting power received by the input shaft 110 to be transmitted along the power path 146 and toward or away from the first gearset 128. The junction 156 also permits power received by the input shaft 110 to be transmitted toward or away from the third gearset 132 along the power path 146. As such, power may be transmitted along the power path 146 from the junction 156 to the first gearset 128, and power transmitted to the first gearset 128 may be transmitted thereafter to the junction 158 and/or recirculated toward the junction 156 along one of the power paths 150, 152, 154. Power may also be transmitted along the power path 146 from the junction 156 to the third gearset 132, and power transmitted to the third gearset 132 may be transmitted along at least one of the power paths 150, 152, and 154 to one of the power paths 146, 148.

As illustrated in FIGS. 8-24, the first gearset 128 is a "mixing" planetary gearset that allows one portion of power transmitted thereto to be transmitted to the second gearset 130, and another portion of power transmitted thereto to be recirculated back toward the input shaft 110. Each component of the first gearset 128 (i.e., each of a sun gear, a carrier, a ring gear, and a plurality of planet gears included in the first gearset 128 as described in more detail below) rotates and is configured to transmit power (i.e., no component of the first gearset 128 is grounded).

The power path 146 utilizes a "fixed" and a "variable" sub-path to transmit power, whereas the power path 148 utilizes only a "fixed" sub-path to transmit power. Power transmitted along a "fixed" sub-path is transmitted at a fixed mechanical ratio. Conversely, power transmitted along a "variable" sub-path is transmitted over a continuously-variable ratio range, i.e., embodied as power transmitted through the variator 114. The "fixed" and "variable" sub-paths of the power path 146 and the "fixed" sub-path of the power path 148 are described in more detail below.

The power path 148 is defined by a junction 157, the second clutch 118, and the junction 158. The power path 148 utilizes at least one of the power paths 150, 152, 154 and/or the power path 146 to transmit power from the input shaft 110 to the output shaft 112 as shown in FIGS. 8-24. The power path 148 is "direct" in that power transmitted along the power path 148 is not split or recirculated as shown in FIGS. 8-24.

Figure 11:
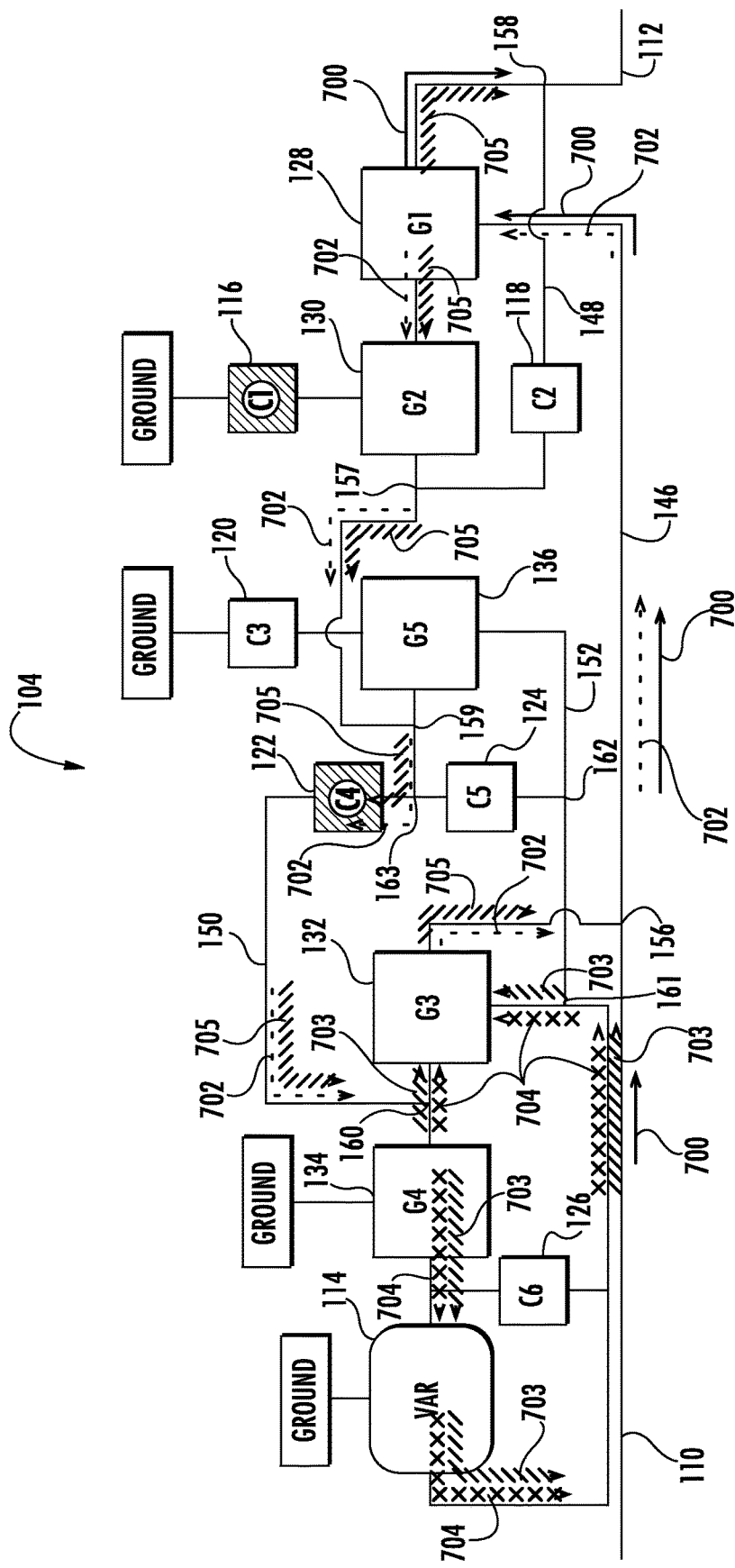
FIG. 11 is a block diagrammatic view of the infinitely variable transmission of FIG. 3 showing power flow therethrough in a second operating mode.
Figure 14:
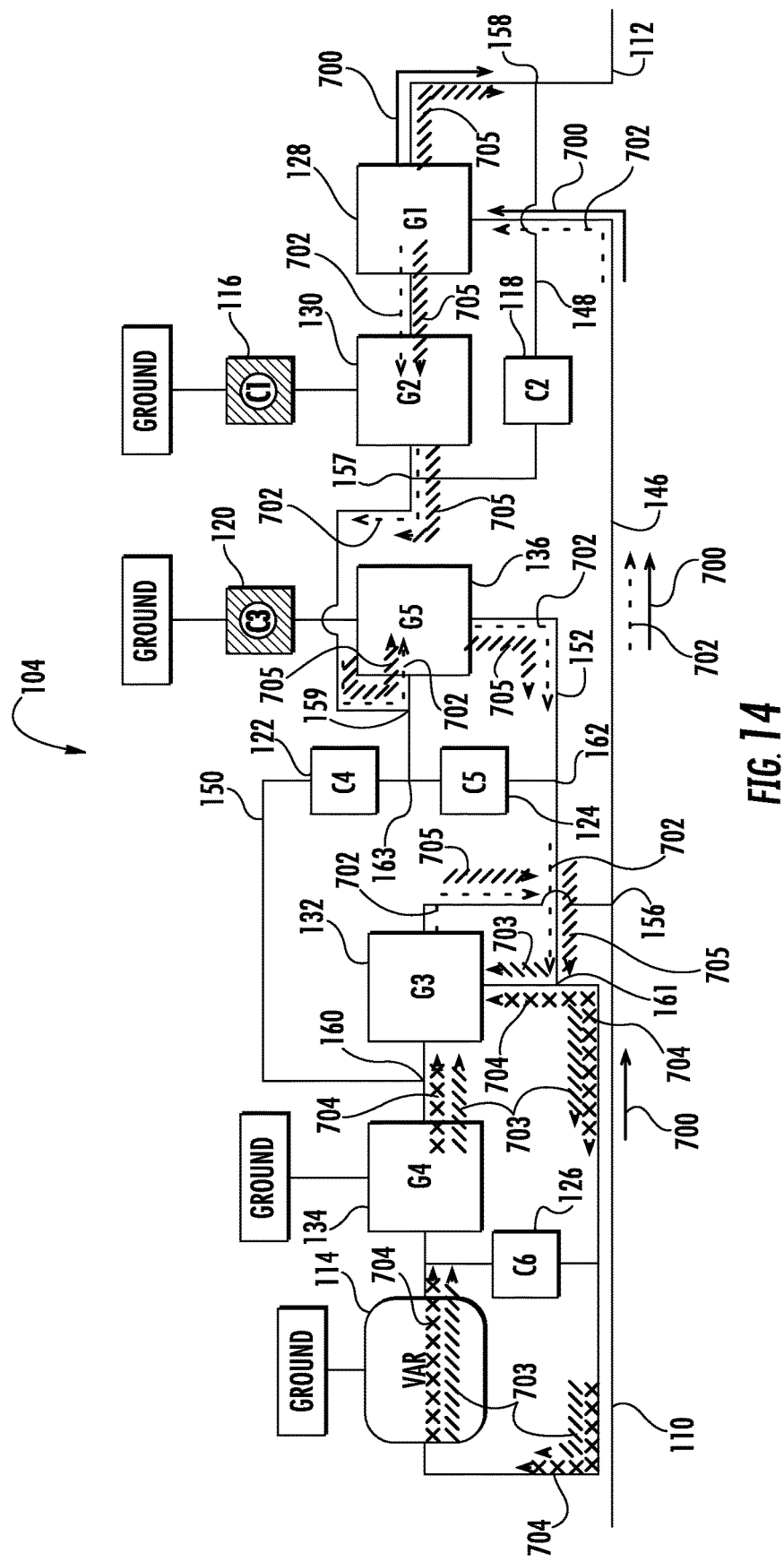
FIG. 14 is a block diagrammatic view of the infinitely variable transmission of FIG. 3 showing power flow therethrough in a third operating mode.

The "fixed" sub-path of the power path 146 corresponds to power flowing from the junction 156 to the first gearset 128 and from the first gearset 128 to the junction 158. The "variable" sub-path of the power path 146 may correspond to power flowing from the junction 156 to a junction 159 through both the first and second gearsets 128, 130 and the junction 157 and therefrom toward the third gearset 132 along the power path 150 when the fourth clutch 122 is engaged and the variator bypass clutch 126 is not engaged (e.g., as shown in FIG. 11). Alternatively, the "variable" sub-path of the power path 146 may correspond to power flowing from the junction 156 to the junction 159 through the first and second gearsets 128, 130 and the junction 157 and therefrom toward the third gearset 132 along the power path 152 when the third clutch 120 is engaged and the variator bypass clutch 126 is not engaged (e.g., as shown in FIG. 14).

The "fixed" sub-path of the power path 148 corresponds to power flowing from the junction 157 to the junction 158 and therefrom to the output shaft 112 when the second clutch 118 is engaged. Power may be transmitted to the junction 157 from the junction 156 along one of the power paths 150, 152, 154, or power may be transmitted to the junction 157 from the junction 156 along the power path 146.

The power path 150 is defined by the third gearset 132, a junction 160, the fourth clutch 122, the junction 159, a junction 163, the fourth gearset 134, the variator 114, the variator bypass clutch 126, and a junction 161. Similar to the power path 146, the power path 150 utilizes a "fixed" and a "variable" sub-path to transmit power between components of the transmission 104. The "fixed" sub-path of the power path 150 corresponds to power flowing through the third gearset 132, the junction 160, and the junction 159 when the fourth clutch 122 is engaged (e.g., as shown in FIG. 11). The "variable" sub-path of the power path 150 corresponds to power flowing between the junction 160 and a junction 161 (i.e., through the fourth gearset 134 and the variator 114) when the fourth clutch 122 is engaged and the variator bypass clutch 126 is not engaged (e.g., as shown in FIG. 11).

The power path 152 is defined by the third gearset 132, the junction 161, the junction 162, the fifth gearset 136, the third clutch 120, the junction 157, the fourth gearset 134, the variator 114, and the variator bypass clutch 126. Similar to the power path 150, the power path 152 utilizes a "fixed" sub-path and a "variable" sub-path to transmit power between components of the transmission 104. The "fixed" sub-path of the power path 152 corresponds to power flowing through the junctions 157, 161, 162 and the third gearset 132 when the third clutch 120 is engaged (e.g., as shown in FIG. 14). The "variable" sub-path of the power path 152 corresponds to power flowing between the junction 160 and the junction 161 when the third clutch 120 is engaged and the variator bypass clutch 126 is not engaged (e.g., as shown in FIG. 14).

Figure 23:
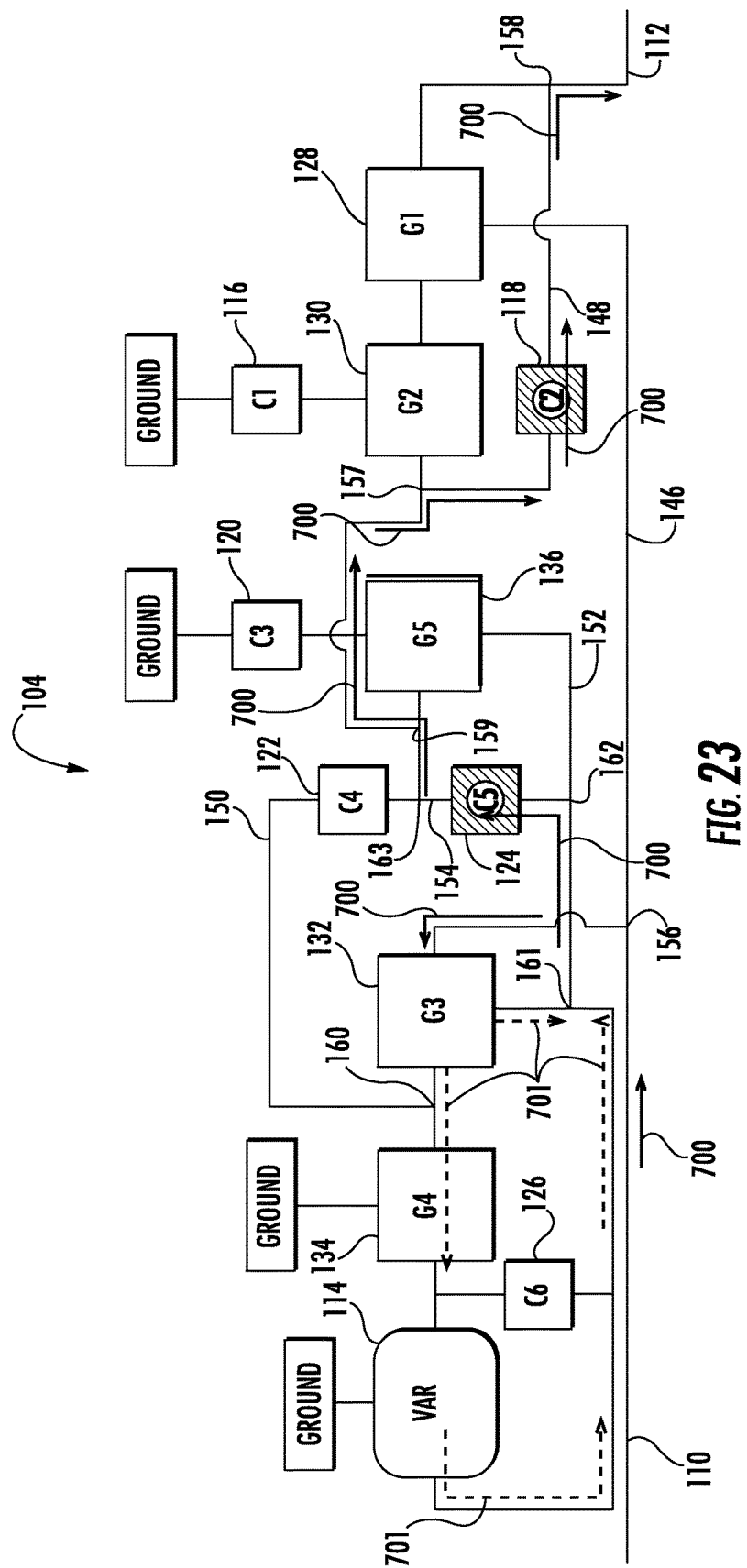
FIG. 23 is a block diagrammatic view of the infinitely variable transmission of FIG. 3 showing power flow therethrough in a sixth operating mode.

The power path 154 is defined by the third gearset 132, the junctions 161, 162, the fifth clutch 124, the junction 157, the junction 163, the fourth gearset 134, the variator 114, and the variator bypass clutch 126. Similar to the power path 152, the power path 154 utilizes a "fixed" and a "variable" sub-path to transmit power between components of the transmission 104. The "fixed" sub-path of the power path 154 corresponds to power flowing through the third gearset 132 and the junctions 161, 162, 157 when the fifth clutch 124 is engaged (e.g., as shown in FIG. 23). The "variable" sub-path of the power path 154 corresponds to power flowing between the junction 161 and the junction 160 when the fifth clutch 124 is engaged and the variator bypass clutch 126 is not engaged (e.g., as shown in FIG. 23).

Each of the power paths 150, 152, 154 includes the third gearset 132. As shown in FIGS. 8-24, the third gearset 132 is a "mixing" planetary gearset that allows one portion of power transmitted thereto to be transmitted along at least one of the power paths 150, 152, 154, and another portion of power transmitted thereto to be recirculated back toward the junction 156 from at least one of the power paths 150, 152, 154. Additionally, power flows may combine at the third gearset 132 (e.g., a first power flow combines with a second power flow at the third gearset 132 as shown in FIGS. 11-15). Each component of the third gearset 132 (i.e., a sun gear, a carrier, a ring gear, and a plurality of planet gears of the third gearset 132 as described in more detail below) rotates and is configured to transmit power (i.e., no component of the third gearset 132 is grounded).

Figure 4:
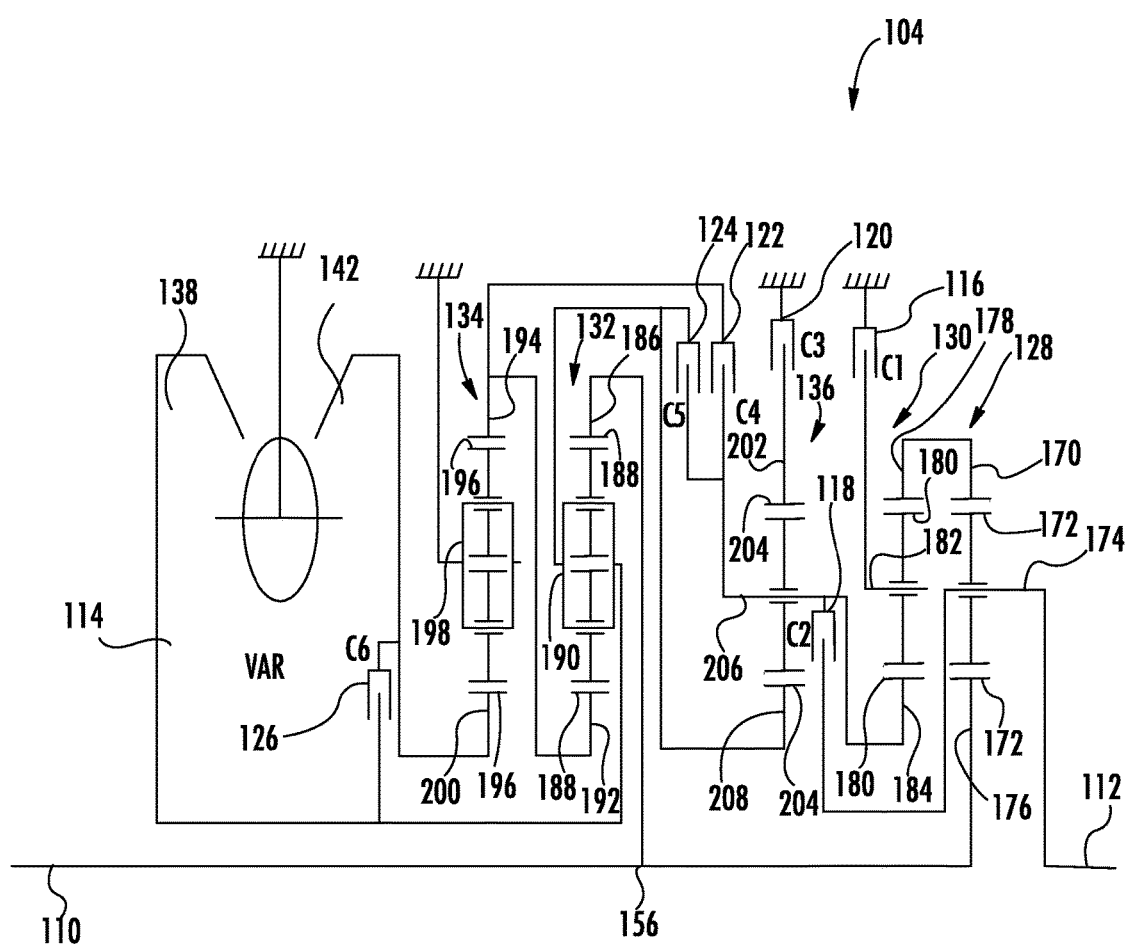
FIG. 4 is a schematic of the architecture of FIG. 3 and the associated transmission components arranged in a first configuration in a first embodiment of the disclosure.

Referring now to FIG. 4, as discussed above, the variator 114, the plurality of gearsets 127, and the plurality of clutches 115 of the transmission 104 are physically arranged between the input shaft 110 and the output shaft 112 of the transmission 104. In the illustrative physical arrangement of the transmission 104, the variator 114 is positioned in front of the plurality of clutches 115 and the plurality of gearsets 127 relative to the input shaft 110 as shown in FIG. 4.

The first gearset 128 of the plurality of gearsets 127 is configured to receive power supplied by the input shaft 110 and transmitted to the junction 156 and thereafter to the first gearset 128 as shown, for example, in FIGS. 11-16. The first gearset 128 is illustratively a simple planetary gearset that includes a ring gear 170, a plurality of planet gears 172, a carrier 174, and a sun gear 176. Each of the planet gears 172 is intermeshed with the ring gear 170 and the sun gear 176, and each of the planet gears 172 is supported for rotation by the carrier 174. Power from the input shaft 110 is transmitted to the junction 156 and therefrom to the sun gear 176. The ring gear 170 of the first gearset 128 is coupled to the second gearset 130, and the carrier 174 of the first gearset 128 is coupled to the output shaft 112. The second clutch 118 is engageable to couple the carrier 174 of the first gearset 128 to the fifth gearset 136.

The second gearset 130 of the plurality of gearsets 127 is configured to receive power supplied by the input shaft 110 that is transmitted to the junction 156 and therefrom to the second gearset 130 through the first gearset 128 as shown, for example, in FIGS. 11-16. The second gearset 130, similar to the first gearset 128, is illustratively a simple planetary gearset that includes a ring gear 178, a plurality of planet gears 180, a carrier 182, and a sun gear 184. Each of the planet gears 180 is intermeshed with the ring gear 178 and the sun gear 184, and each of the planet gears 180 is supported for rotation by the carrier 182. The first clutch 116 is engageable to couple the carrier 182 to a stationary, non-rotating part of the transmission 104, thereby preventing the carrier 182 from rotating (i.e., braking the carrier 182). For instance, the first clutch 116 may be engaged to couple the carrier 182 to a housing of the transmission 104. The sun gear 184 is coupled to the fifth gearset 136, and the ring gear 178 is coupled to the ring gear 170 of the first gearset 128.

Figure 8:
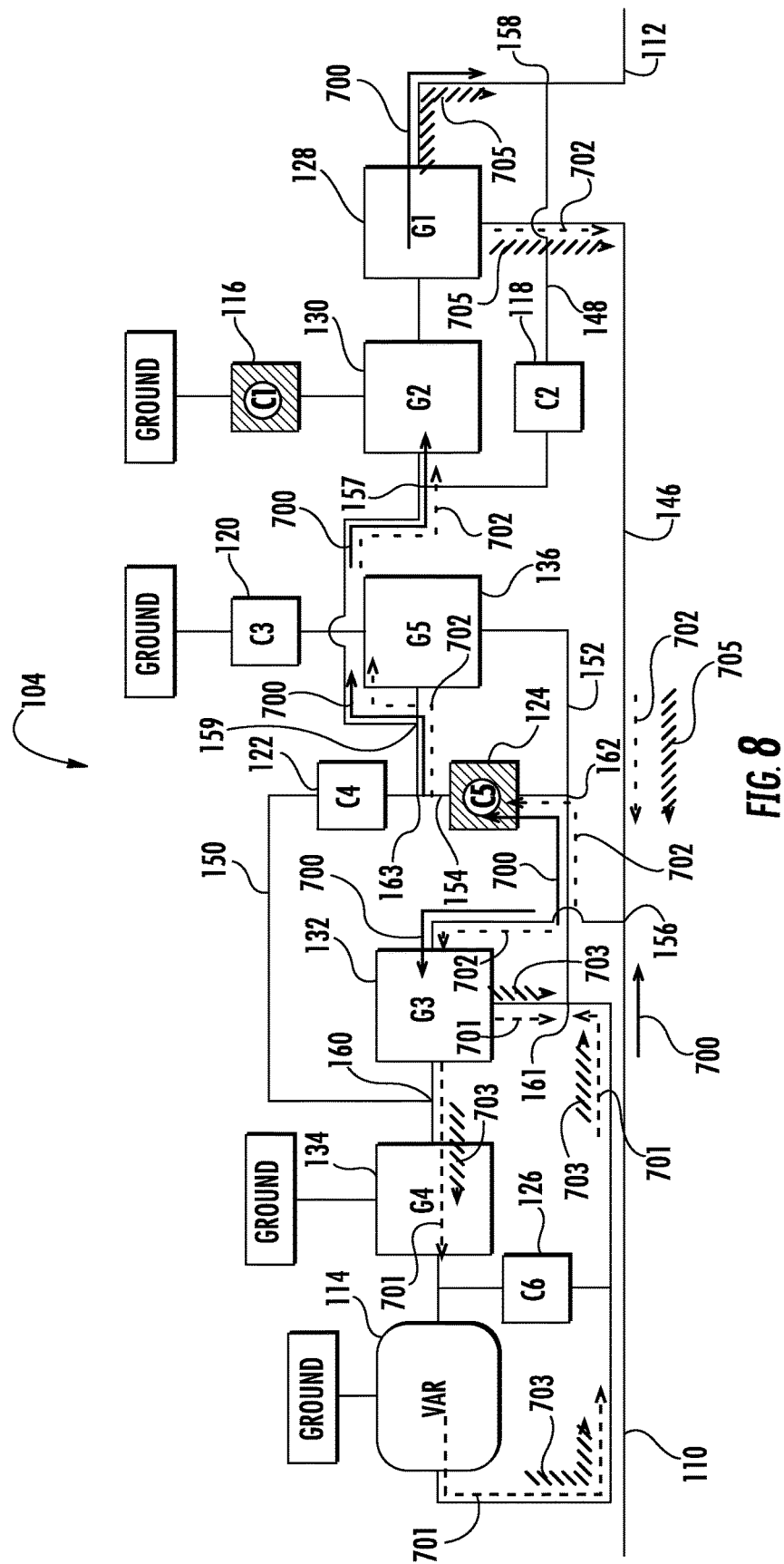
FIG. 8 is a block diagrammatic view of the infinitely variable transmission of FIG. 3 showing power flow therethrough in a first operating mode.
Figure 9:
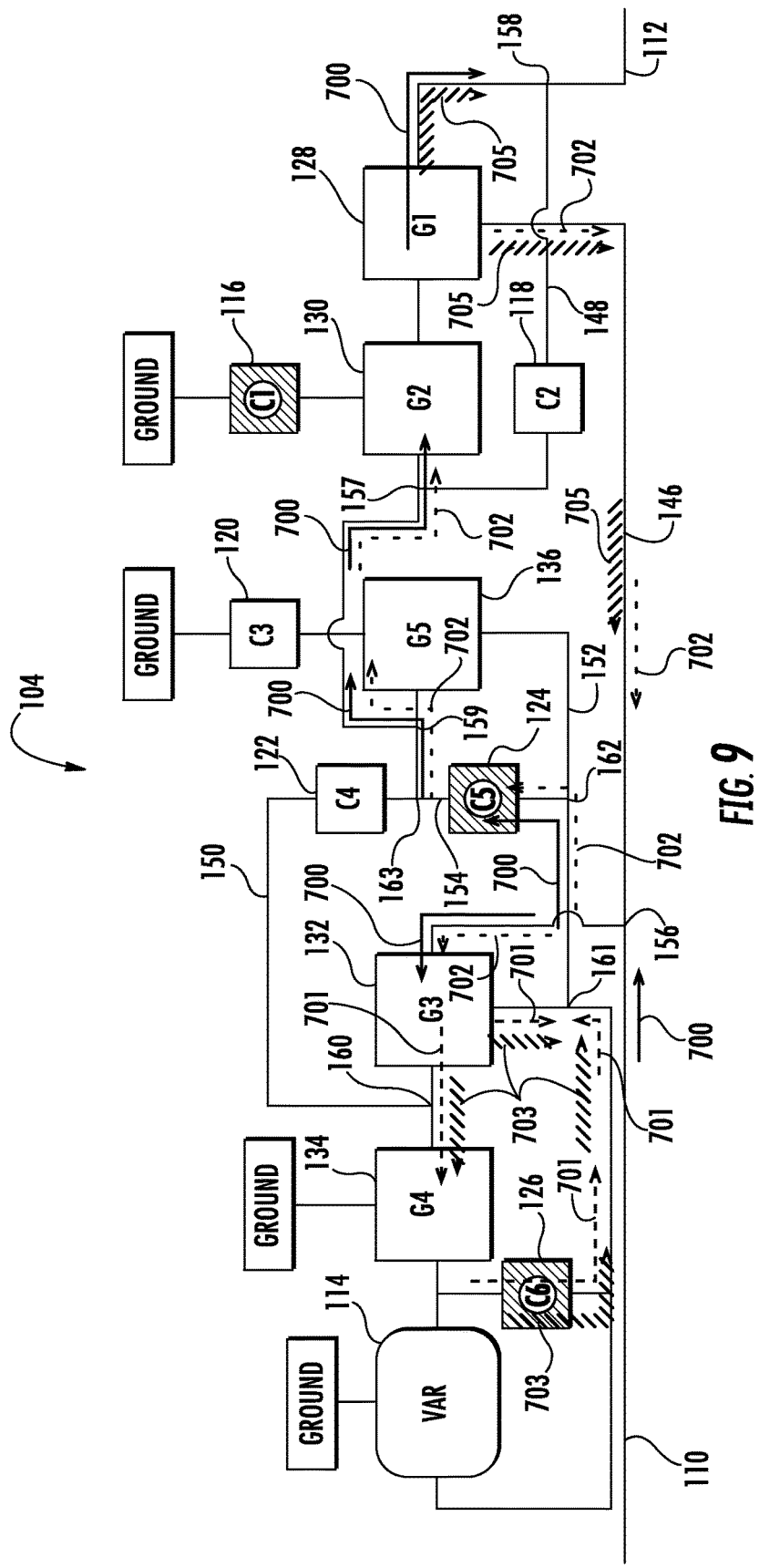
FIG. 9 is a block diagrammatic view of the infinitely variable transmission of FIG. 3 showing power flow therethrough in a first variator bypass operating mode.
Figure 10:
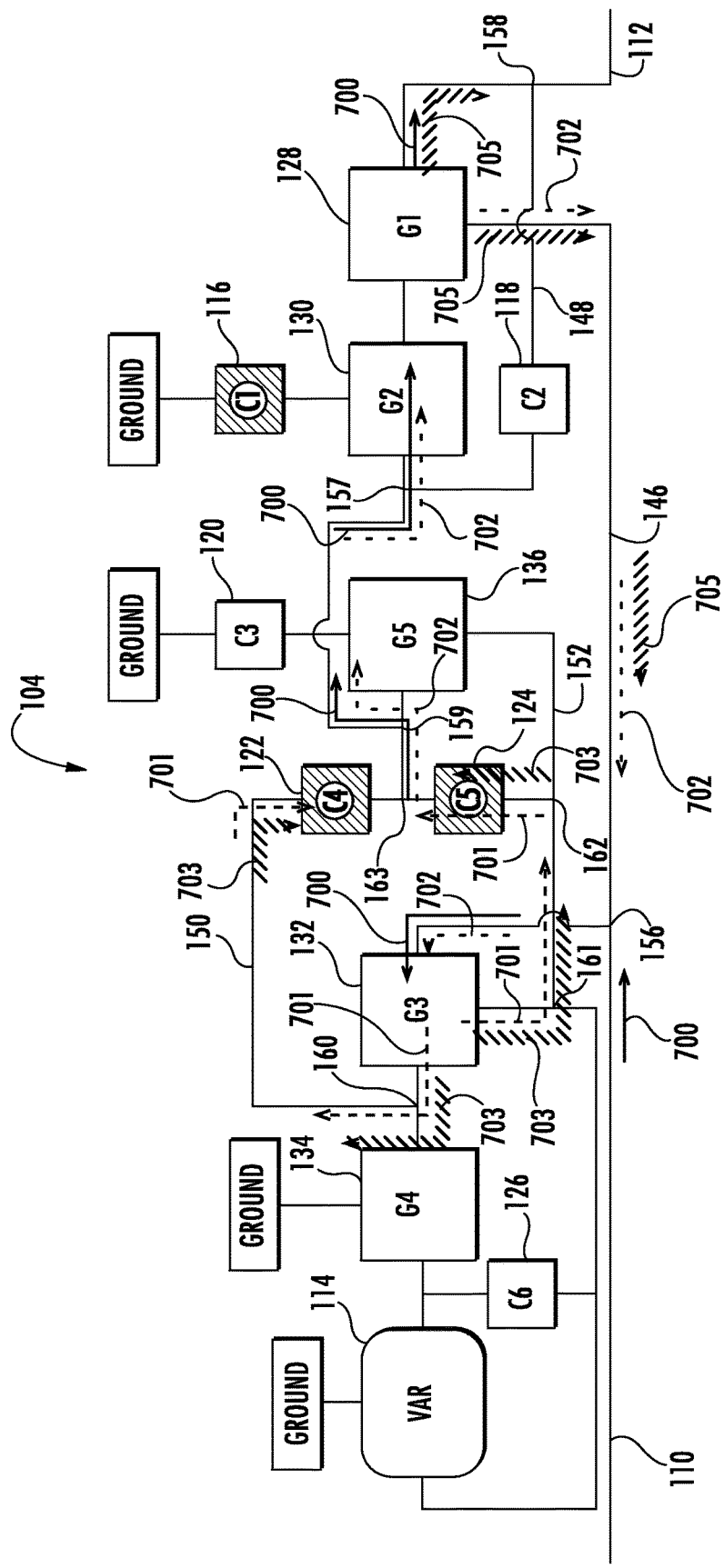
FIG. 10 is a block diagrammatic view of the infinitely variable transmission of FIG. 3 showing power flow therethrough in a first synchronous operating mode.

The third gearset 132 of the plurality of gearsets 127 is configured to receive power supplied by the input shaft 110 that is transmitted to the junction 156 and therefrom to the third gearset 132 as shown, for example, in FIGS. 8-10. The third gearset 132 is illustratively an idler-planet planetary gearset that includes a ring gear 186, a plurality of planet gears 188 including one or more idler-planet gears, a carrier 190, and a sun gear 192. Each of the planet gears 188 is intermeshed with either the ring gear 186 or the sun gear 192 and another one of the planet gears 188, and each of the planet gears 188 is supported for rotation by the carrier 190. Power from the input shaft 110 is transmitted from the junction 156 to the ring gear 186. The carrier 190 is coupled to the input ring 138 of the variator 114, and the variator bypass clutch 126 is engageable to couple the carrier 190 to the output ring 142 of the variator 114 to bypass the variator 114 so that power is transmitted at a 1:1 ratio from the carrier 190 to the output ring 142 through the variator bypass clutch 126. The carrier 190 is coupled to fifth gearset 136, and the fifth clutch 124 is engageable to couple the carrier 190 to the fifth gearset 136. The sun gear 192 is coupled to the fourth gearset 134.

The fourth gearset 134 of the plurality of gearsets 127 is configured to receive power supplied by the input shaft 110 that is transmitted from the junction 156 to the third gearset 132 and therefrom to the fourth gearset 134 as shown, for example, in FIGS. 8-9 and 17-18. The fourth gearset 134 is illustratively an idler-planet planetary gearset that includes a ring gear 194, a plurality of planet gears 196 including one or more idler-planet gears, a carrier 198, and a sun gear 200. Each of the planet gears 196 is intermeshed with either the ring gear 194 or the sun gear 200 and another one of the planet gears 196, and each of the planet gears 196 is supported for rotation by the carrier 198. The carrier 198 is coupled to a stationary, non-rotating part of the transmission 104, thereby preventing the carrier 198 from rotating (i.e., braking the carrier 198). For instance, the carrier 198 may be coupled to the housing of the transmission 104. The sun gear 200 is coupled to the output ring 142 of the variator 114, and the variator bypass clutch 126 is engageable to couple the carrier 190 of the third gearset 132 to the sun gear 200 of the fourth gearset 134 to transmit power therebetween at a 1:1 ratio (i.e., power flows directly through the variator bypass clutch 126 so that the variator 114 is bypassed). The ring gear 194 is coupled to the sun gear 192 of the third gearset 132. The fourth clutch 122 is engageable to couple the ring gear 194 to the fifth gearset 136.

Figure 13:
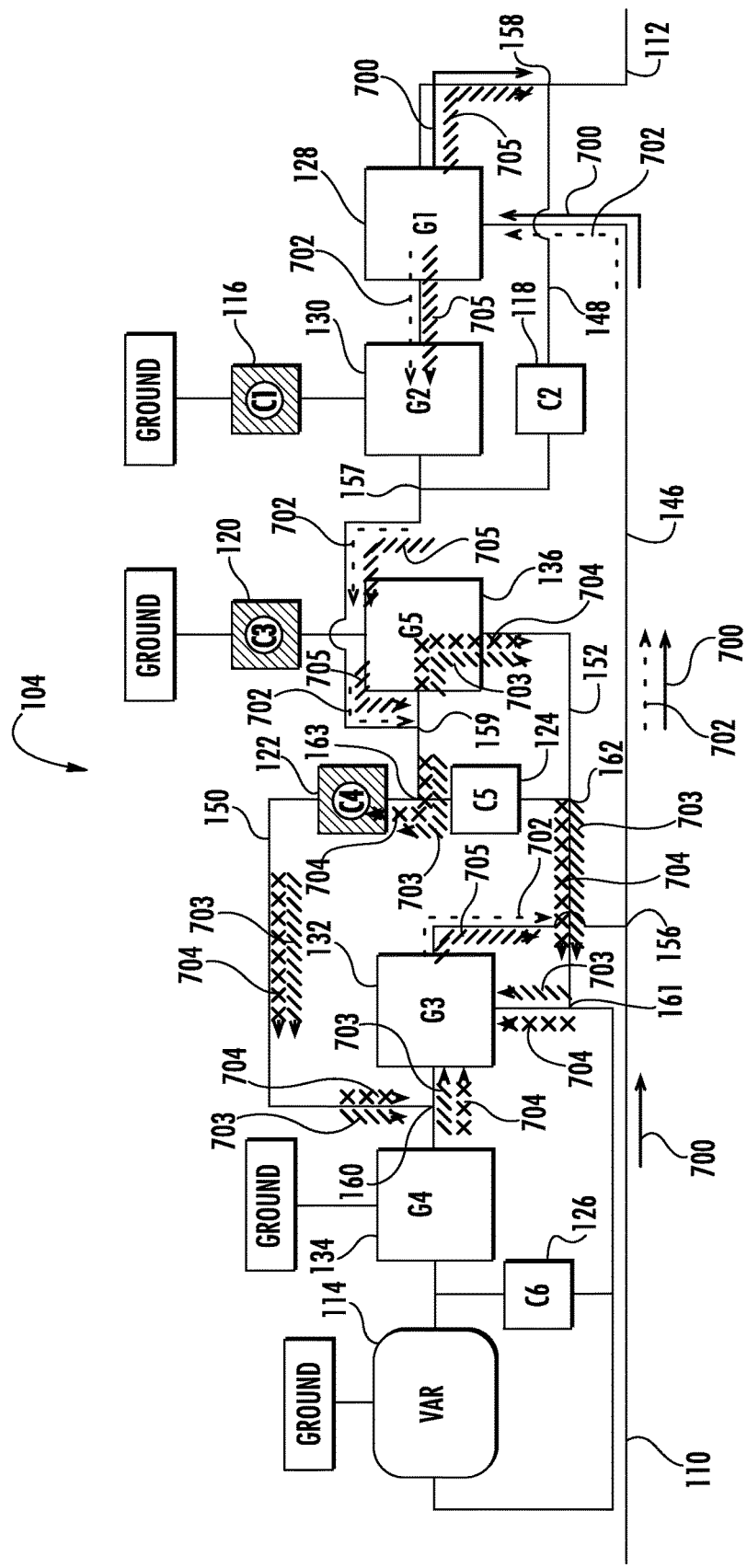
FIG. 13 is a block diagrammatic view of the infinitely variable transmission of FIG. 3 showing power flow therethrough in a second synchronous operating mode.
Figure 15:
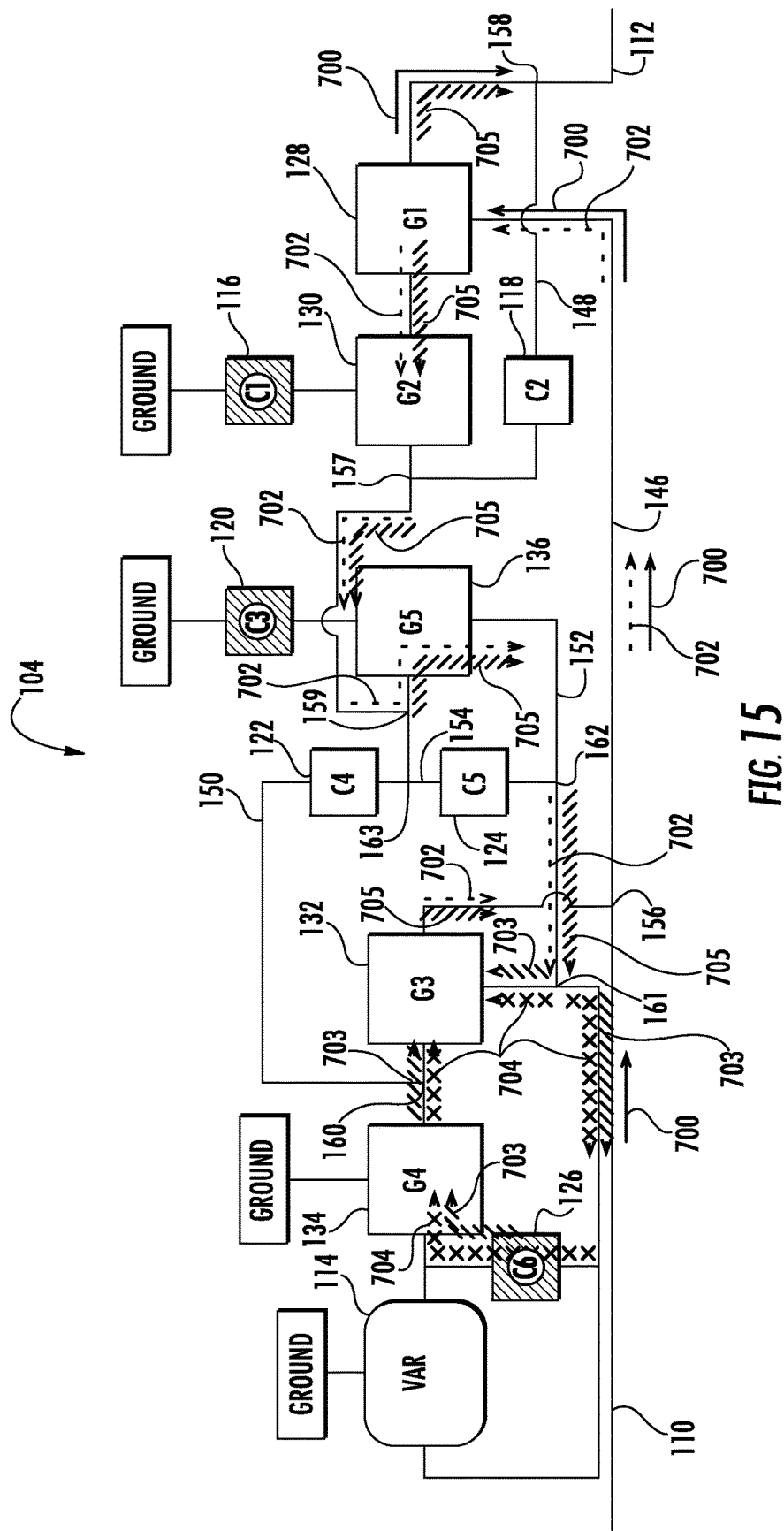
FIG. 15 is a block diagrammatic view of the infinitely variable transmission of FIG. 3 showing power flow therethrough in a third variator bypass operating mode.

The fifth gearset 136 of the plurality of gearsets 127 is configured to receive power supplied by the input shaft 110 that is transmitted to the junction 156 and thereafter to the fifth gearset 136 through the first and second gearsets 128, 130 as shown, for example, in FIGS. 13-15. The fifth gearset 136, similar to both the first gearset 128 and the second gearset 130, is illustratively a simple planetary gearset that includes a ring gear 202, a plurality of planet gears 204, a carrier 206, and a sun gear 208. Each of the planet gears 204 is intermeshed with the ring gear 202 and the sun gear 208, and each of the planet gears 204 is supported for rotation by the carrier 206. The third clutch 120 is engageable to couple the ring gear 202 to a stationary, non-rotating part of the transmission 104, thereby preventing the ring gear 202 from rotating (i.e., braking the ring gear 202). For instance, the third clutch 120 may be engaged to couple the ring gear 202 to the housing of the transmission 104. The sun gear 208 is coupled to the carrier 190 of the third gearset 132. The carrier 206 is coupled to the sun gear 184 of the second gearset 130, and the second clutch is engageable to couple the carrier 206 to the carrier 174 of the first gearset 128. The fifth clutch 124 is engageable to couple the carrier 206 to the carrier 190 of the third gearset 132, and the fourth clutch 122 is engageable to couple the carrier 206 to the ring gear 194 of the fourth gearset 134.

A power take-off device (not shown) may be coupled to the variator 114 to transmit power from the drive unit 102 to the variator 114 and therefrom to the power-take off device. The power take-off device may be coupled to the input ring 138 or the output ring 142 of the variator 114. When the transmission 104 is placed in a neutral range, the variator 114 may be used to continuously vary the ratio of the power-take off device relative to the rotational speed of the drive unit output shaft 108 and the transmission input shaft 110.

Figure 5:
FIG. 5 is a table showing the various operating modes achievable by the infinitely variable transmission of FIG. 1 and the transmission ratios associated with each mode.

Referring now to FIG. 5, a table 210 illustrates the various operating modes of the transmission 104, the clutches applied in each mode, and the transmission ratio(s) achieved in each mode. It should be understood that the transmission operating modes are the same in each of the first, second, and third embodiments of the present disclosure, and also that the transmission ratios achieved in each mode are the same across those embodiments. The transmission 104 is operable in six operating modes to achieve a variable transmission ratio within a defined transmission ratio range. In all other operating modes, as discussed below, the transmission 104 achieves a single transmission ratio.

The transmission 104 is operable in the "Mode 1" operating mode, when the first clutch 116 and the fifth clutch 124 are contemporaneously engaged as shown in FIG. 5, to achieve a variable transmission ratio within the range of −0.330 (minimum) to 0.00 (maximum). As suggested above, the variable transmission ratio is achievable in "Mode 1" as a result of utilizing the variator 114. The "Mode 1" operating mode covers a reverse ratio range (i.e., a ratio from −0.330 to 0) to a zero ratio (i.e., "Mode 1" serves as a first geared neutral mode).

The transmission 104 is operable in the "Bypass 1" operating mode, when the first clutch 116, the fifth clutch 124, and the variator bypass clutch 126 are contemporaneously engaged as shown in FIG. 5, to achieve a fixed transmission ratio of −0.17. Because the variator 114 is bypassed in the "Bypass 1" mode, only a single fixed transmission ratio is achieved by the transmission 104. The "Bypass 1" operating mode covers a reverse ratio.

The transmission 104 is operable in the "Sync 1-2" operating mode, when the first clutch 116, the fourth clutch 122, and the fifth clutch 124 are contemporaneously engaged as shown in FIG. 5, to achieve a fixed transmission ratio of 0.00. The ratio of 0.00 coincides with the maximum ratio achieved in the "Mode 1" operating mode and the minimum ratio achieved in the "Mode 2" operating mode (discussed below) so that the "Sync 1-2" operating mode effects a transition (i.e., a synchronous shift) between those two modes. A single fixed transmission ratio is achieved by the transmission 104 in the "Sync 1-2" mode because the variator 114 is effectively bypassed. The "Sync 1-2" operating mode covers another zero ratio (i.e., "Sync 1-2" serves as a second geared neutral mode).

The transmission 104 is operable in the "Mode 2" operating mode, when the first clutch 116 and the fourth clutch 122 are contemporaneously engaged as shown in FIG. 5, to achieve a variable transmission ratio within the range of 0.00 (minimum) to 0.196 (maximum). As suggested above, the variable transmission ratio is achievable in "Mode 2" as a result of utilizing the variator 114. The "Mode 2" operating mode covers another zero ratio ("Mode 2" serves as a third geared neutral mode) to a forward ratio range.

The transmission 104 is operable in the "Bypass 2" operating mode, when the first clutch 116, the fourth clutch 122, and the variator bypass clutch 126 are contemporaneously engaged as shown in FIG. 5, to achieve a fixed transmission ratio of 0.099. Because the variator 114 is bypassed in the "Bypass 2" mode, only a single fixed transmission ratio is achieved by the transmission 104. The "Bypass 2" operating mode covers a forward ratio.

The transmission 104 is operable in the "Sync 2-3" operating mode, when the first clutch 116, the third clutch 120, and the fourth clutch 122 are contemporaneously engaged as shown in FIG. 5, to achieve a fixed transmission ratio of 0.196. The ratio of 0.196 coincides with the maximum ratio achieved in the "Mode 2" operating mode and the minimum ratio achieved in the "Mode 3" operating mode (discussed below) so that the "Sync 2-3" operating mode effects a transition (i.e., a synchronous shift) between those two modes. A single fixed transmission ratio is achieved by the transmission 104 in the "Sync 2-3" mode because the variator 114 is effectively bypassed. The "Sync 2-3" operating mode covers another forward ratio.

The transmission 104 is operable in the "Mode 3" operating mode, when the first clutch 116 and the third clutch 120 are contemporaneously engaged as shown in FIG. 5, to achieve a variable transmission ratio within the range of 0.196 (minimum) to 0.292 (maximum). As suggested above, the variable transmission ratio is achievable in "Mode 3" as a result of utilizing the variator 114. The "Mode 3" operating mode covers another forward ratio range.

The transmission 104 is operable in the "Bypass 3" operating mode, when the first clutch 116, the third clutch 120, and the variator bypass clutch 126 are contemporaneously engaged as shown in FIG. 5, to achieve a fixed transmission ratio of 0.243. Because the variator 114 is bypassed in the "Bypass 3" mode, only a single fixed transmission ratio is achieved by the transmission 104. The "Bypass 3" operating mode covers another forward ratio.

The transmission 104 is operable in the "Sync 3-4" operating mode, when the first clutch 116, the second clutch 118, and the third clutch 120 are contemporaneously engaged as shown in FIG. 5, to achieve a fixed transmission ratio of 0.292. The ratio of 0.292 coincides with the maximum ratio achieved in the "Mode 3" operating mode and the minimum ratio achieved in the "Mode 4" operating mode (discussed below) so that the "Sync 3-4" operating mode effects a transition (i.e., a synchronous shift) between those two modes. A single fixed transmission ratio is achieved by the transmission 104 in the "Sync 3-4" mode because the variator 114 is effectively bypassed. The "Sync 3-4" operating mode covers another forward ratio.

The transmission 104 is operable in the "Mode 4" operating mode, when the second clutch 118 and the third clutch 120 are contemporaneously engaged as shown in FIG. 5, to achieve a variable transmission ratio within the range of 0.292 (minimum) to 0.526 (maximum). As suggested above, the variable transmission ratio is achievable in "Mode 4" as a result of utilizing the variator 114. The "Mode 4" operating mode covers another forward ratio range.

The transmission 104 is operable in the "Bypass 4" operating mode, when the second clutch 118, the third clutch 120, and the variator bypass clutch 126 are contemporaneously engaged as shown in FIG. 5, to achieve a fixed transmission ratio of 0.411. Because the variator 114 is bypassed in the "Bypass 4" mode, only a single fixed transmission ratio is achieved by the transmission 104. The "Bypass 4" operating mode covers another forward ratio.

The transmission 104 is operable in the "Sync 4-5" operating mode, when the second clutch 118, the third clutch 120, and the fourth clutch 122 are contemporaneously engaged as shown in FIG. 5, to achieve a fixed transmission ratio of 0.526. The ratio of 0.526 coincides with the maximum ratio achieved in the "Mode 4" operating mode and the minimum ratio achieved in the "Mode 5" operating mode (discussed below) so that the "Sync 4-5" operating mode effects a transition (i.e., a synchronous shift) between those two modes. A single fixed transmission ratio is achieved by the transmission 104 in the "Sync 4-5" mode because the variator 114 is effectively bypassed. The "Sync 4-5" operating mode covers another forward ratio.

The transmission 104 is operable in the "Mode 5" operating mode, when the second clutch 118 and the fourth clutch 122 are contemporaneously engaged as shown in FIG. 5, to achieve a variable transmission ratio within the range of 0.526 (minimum) to 1.000 (maximum). As suggested above, the variable transmission ratio is achievable in "Mode 5" as a result of utilizing the variator 114. The "Mode 5" operating mode covers another forward ratio range.

The transmission 104 is operable in the "Bypass 5" operating mode, when the second clutch 118, the fourth clutch 122, and the variator bypass clutch 126 are contemporaneously engaged as shown in FIG. 5, to achieve a fixed transmission ratio of 0.760. Because the variator 114 is bypassed in the "Bypass 5" mode, only a single fixed transmission ratio is achieved by the transmission 104. The "Bypass 5" operating mode covers another forward ratio.

The transmission 104 is operable in the "Sync 5-6" operating mode, when the second clutch 118, the fourth clutch 122, and the fifth clutch 124 are contemporaneously engaged as shown in FIG. 5, to achieve a fixed transmission ratio of 1.000. The ratio of 1.000 coincides with the maximum ratio achieved in the "Mode 5" operating mode and the minimum ratio achieved in the "Mode 6" operating mode (discussed below) so that the "Sync 5-6" operating mode effects a transition (i.e., a synchronous shift) between those two modes. A single fixed transmission ratio is achieved by the transmission 104 in the "Sync 5-6" mode because the variator 114 is effectively bypassed. The "Sync 5-6" operating mode covers another forward ratio.

The transmission 104 is operable in the "Mode 6" operating mode, when the second clutch 118 and the fifth clutch 124 are contemporaneously engaged as shown in FIG. 5, to achieve a variable transmission ratio within the range of 1.000 (minimum) to 1.800 (maximum). As suggested above, the variable transmission ratio is achievable in "Mode 6" as a result of utilizing the variator 114. The "Mode 6" operating mode covers another forward ratio range.

The transmission 104 is operable in the "Bypass 6" operating mode, when the second clutch 118, the fifth clutch 124, and the variator bypass clutch 126 are contemporaneously engaged as shown in FIG. 5, to achieve a fixed transmission ratio of 0.596. Because the variator 114 is bypassed in the "Bypass 6" mode, only a single fixed transmission ratio is achieved by the transmission 104. The "Bypass 6" operating mode covers another forward ratio.

Figure 6:
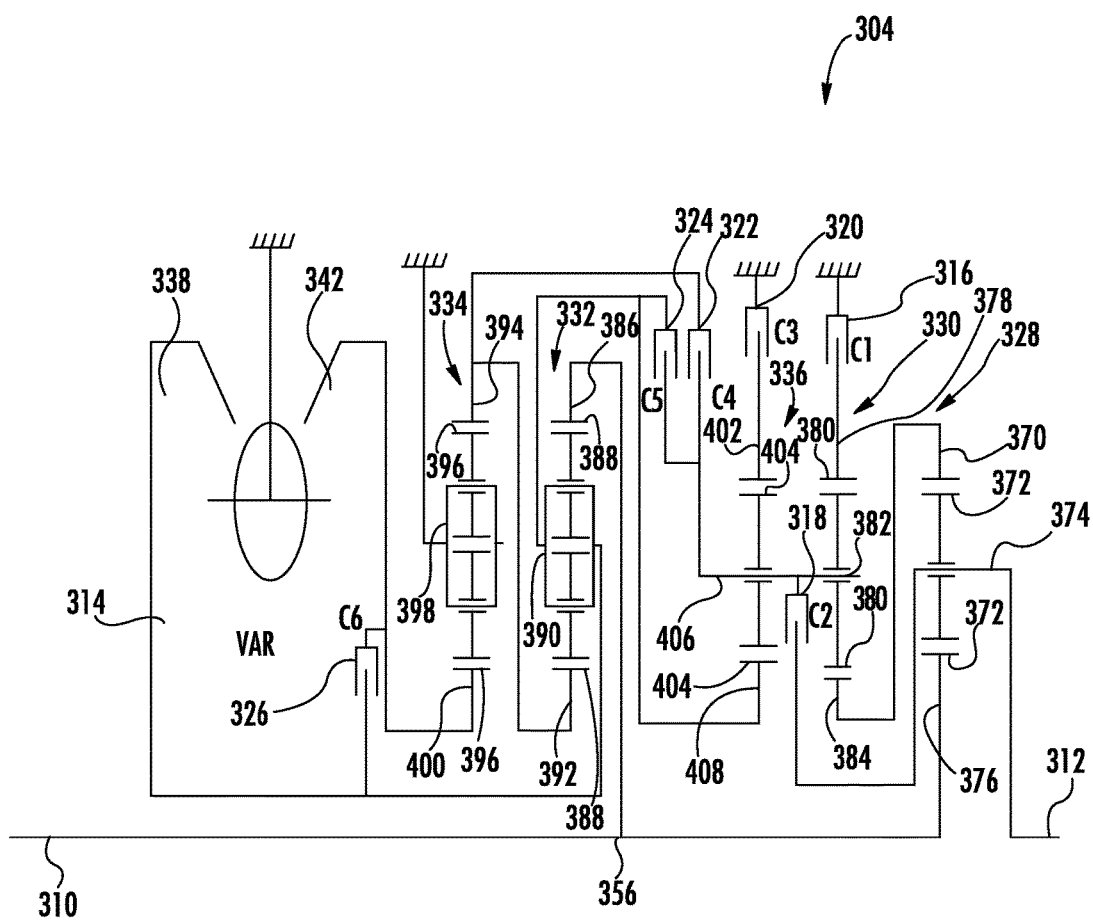
FIG. 6 is a schematic of the architecture of FIG. 3 and the associated transmission components arranged in a second configuration in a second embodiment of the disclosure.

Referring now to FIG. 6, the architecture of the transmission of FIG. 3 is shown in a second configuration in the second embodiment of the disclosure. The transmission of the second embodiment is designated as the "transmission 304." The components of the transmission 304 (i.e., the clutches, the gearsets, and the variator) as shown in FIG. 6 are similar to the components of the transmission 104 as shown in FIG. 3. It should be noted, however, that the mechanical connections between the components of the transmission 304 and the components of the transmission 104 may differ. For the purposes of clarity, each component of the transmission 304 having a "300" series label corresponds generally to the component of the transmission 104 having a "100" series label, and each component of the transmission 304 having a "400" series label corresponds generally to the component of the transmission 104 having a "200" series label. For example, the variator 314 of the transmission 304 corresponds to the variator 114 of the transmission 104, and the sun gear 400 of the fourth gearset 334 of the transmission 304 corresponds to the sun gear 200 of the fourth gearset 134 of the transmission 104. Given those similarities, it should be understood that the transmission 304 may be substituted for the transmission 104 in the motor vehicle 100 shown in FIG. 1. In addition, the power paths defined by the architecture of the transmission 304 are identical to the power paths defined by the architecture of the transmission 104.

The first gearset 328 is configured to receive power supplied by the input shaft 310 that is transmitted to the junction 356 and thereafter to the first gearset 328. The first gearset 328 is illustratively a simple planetary gearset that includes a ring gear 370, a plurality of planet gears 372, a carrier 374, and a sun gear 376. Each of the planet gears 372 is intermeshed with the ring gear 370 and the sun gear 376, and each of the planet gears 372 is supported for rotation by the carrier 374. Power from the input shaft 310 is transmitted to the junction 356 and therefrom to the sun gear 376. The ring gear 370 of the first gearset 328 is coupled to the second gearset 330, and the carrier 374 of the first gearset 328 is coupled to the output shaft 312. The second clutch 318 is engageable to couple the carrier 374 of the first gearset 328 to the fifth gearset 336.

The second gearset 330 is configured to receive power supplied by the input shaft 310 that is transmitted from the junction 356 to the first gearset 328 and thereafter to the second gearset 330. The second gearset 330, similar to the first gearset 328, is illustratively a simple planetary gearset that includes a ring gear 378, a plurality of planet gears 380, a carrier 382, and a sun gear 384. Each of the planet gears 380 is intermeshed with the ring gear 378 and the sun gear 384, and each of the planet gears 380 is supported for rotation by the carrier 382. The first clutch 316 is engageable to couple the ring gear 378 to a stationary, non-rotating part of the transmission 304, thereby preventing the ring gear 378 from rotating (i.e., braking the ring gear 378). For instance, the first clutch 316 may be engaged to couple the ring gear 378 to a housing of the transmission 304. The sun gear 384 is coupled to the ring gear 370 of the first gearset 328, and the carrier 382 is coupled to the fifth gearset 336. The second clutch 318 is engageable to couple the carrier 382 to the carrier 374 of the first gearset 328.

The third gearset 332 is configured to receive power supplied by the input shaft 310 that is transmitted to the junction 356 and therefrom to the third gearset 332. The third gearset 332 is illustratively an idler-planet planetary gearset that includes a ring gear 386, a plurality of planet gears 388 including one or more idler-planet gears, a carrier 390, and a sun gear 392. Each of the planet gears 388 is intermeshed with either the ring gear 386 or the sun gear 392 and another one of the planet gears 388, and each of the planet gears 388 is supported for rotation by the carrier 390. Power from the input shaft 310 is transmitted from the junction 356 to the ring gear 386. The carrier 390 is coupled to the input ring 338 of the variator 314, and the variator bypass clutch 326 is engageable to couple the carrier 390 to the output ring 342 of the variator 314 to bypass the variator 314 so that power is transmitted at a 1:1 ratio from the carrier 390 to the output ring 342 through the variator bypass clutch 326. The carrier 390 is coupled to fifth gearset 336, and the fifth clutch 324 is engageable to couple the carrier 390 to the fifth gearset 336. The sun gear 392 is coupled to the fourth gearset 334.

The fourth gearset 334 is configured to receive power supplied by the input shaft 310 that is transmitted from the junction 356 to the third gearset 332 and therefrom to the fourth gearset 334. The fourth gearset 334 is illustratively an idler-planet planetary gearset that includes a ring gear 394, a plurality of planet gears 396 including one or more idler-planet gears, a carrier 398, and a sun gear 400. Each of the planet gears 396 is intermeshed with either the ring gear 394 or the sun gear 400 and another one of the planet gears 396, and each of the planet gears 396 is supported for rotation by the carrier 398. The carrier 398 is coupled to a stationary, non-rotating part of the transmission 304, thereby preventing the carrier 398 from rotating (i.e., braking the carrier 398). For instance, the carrier 398 may be coupled to the housing of the transmission 304. The sun gear 400 is coupled to the output ring 342 of the variator 314, and the variator bypass clutch 326 is engageable to couple the carrier 390 of the third gearset 332 to the sun gear 400 of the fourth gearset 334 to transmit power therebetween at a 1:1 ratio (i.e., power flows directly through the variator bypass clutch 326 so that the variator 314 is bypassed). The ring gear 394 is coupled to the sun gear 392 of the third gearset 332. The fourth clutch 322 is engageable to couple the ring gear 394 to the fifth gearset 336.

The fifth gearset 336 is configured to receive power supplied to the input shaft 310 that is transmitted to the junction 356 and therefrom to the fifth gearset 336 through the first and second gearsets 328, 330. The fifth gearset 336, similar to both the first gearset 328 and the second gearset 330, is illustratively a simple planetary gearset that includes a ring gear 402, a plurality of planet gears 404, a carrier 406, and a sun gear 408. Each of the planet gears 404 is intermeshed with the ring gear 402 and the sun gear 408, and each of the planet gears 404 is supported for rotation by the carrier 406. The third clutch 320 is engageable to couple the ring gear 402 to a stationary, non-rotating part of the transmission 304, thereby preventing the ring gear 402 from rotating (i.e., braking the ring gear 402). For instance, the third clutch 320 may be engaged to couple the ring gear 402 to the housing of the transmission 304. The sun gear 408 is coupled to the carrier 390 of the third gearset 332. The carrier 406 is coupled to the carrier 382 of the second gearset 330, and the second clutch 318 is engageable to couple the carrier 406 to the carrier 374 of the first gearset 328. The fourth clutch 322 is engageable to couple the carrier 406 to the ring gear 394 of the fourth gearset 334, and the fifth clutch 324 is engageable to couple the carrier 406 to the carrier 390 of the third gearset 332.

Figure 7:
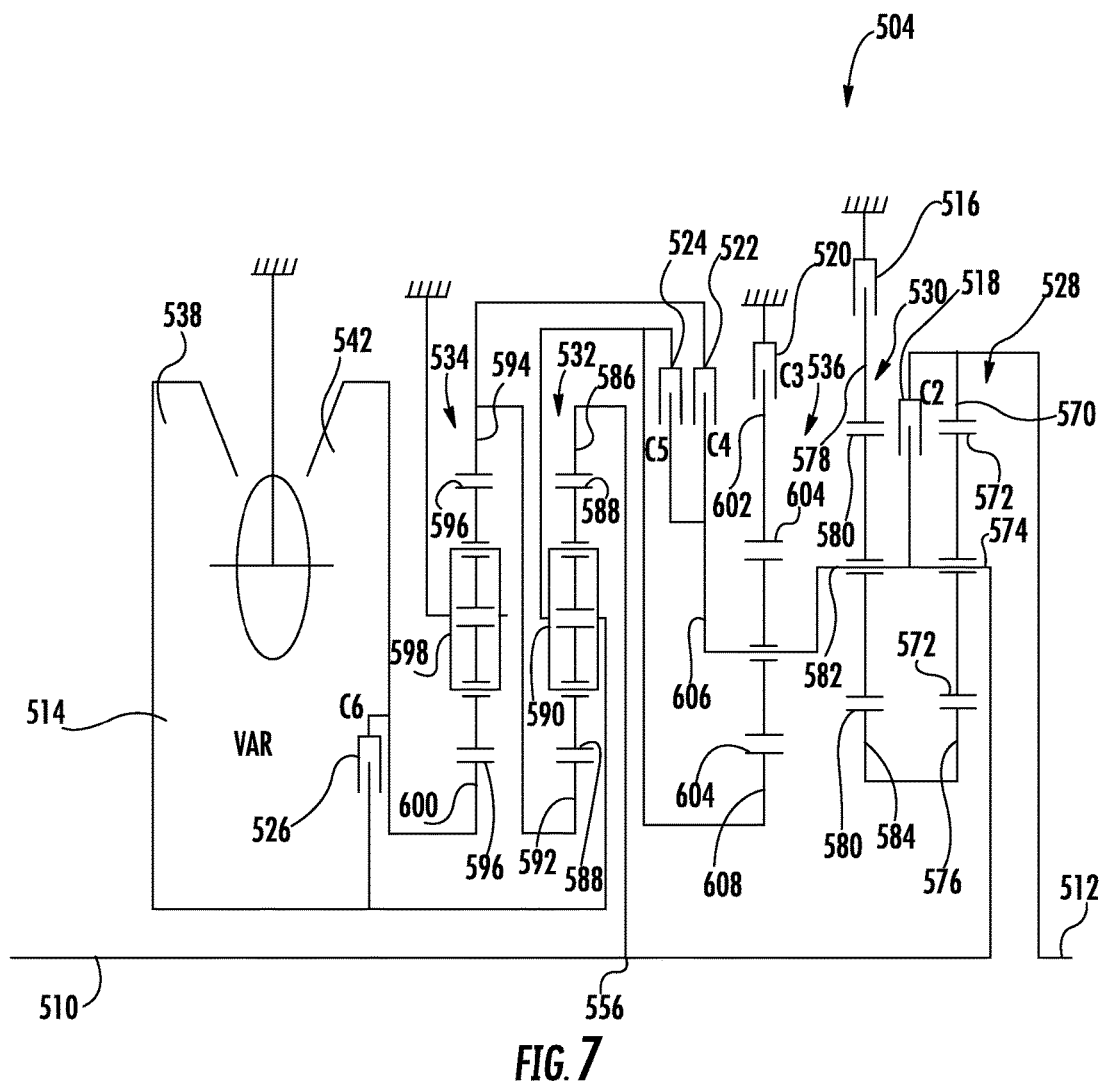
FIG. 7 is a schematic of the architecture of FIG. 3 and the associated transmission components arranged in a third configuration in a third embodiment of the disclosure.

Referring now to FIG. 7, the architecture of the transmission of FIG. 3 is shown in a third configuration in the third embodiment of the disclosure. The transmission of the third embodiment is designated as the "transmission 504." The components of the transmission 504 (i.e., the clutches, the gearsets, and the variator) as shown in FIG. 7 are similar to the components of the transmission 304 shown in FIG. 6, and the components of the transmission 104 as shown in FIG. 3. It should be noted, however, that the mechanical connections between the components of the transmission 504 and the components of the transmissions 304, 104 may differ. For the purposes of clarity, each component of the transmission 504 having a "500" series label corresponds generally to the component of the transmission 304 having a "300" series label, and each component of the transmission 504 having a "600" series label corresponds generally to the component of the transmission 304 having a "400" series label. For example, the variator 514 of the transmission 504 corresponds to the variator 314 of the transmission 304, and the sun gear 600 of the fourth gearset 534 of the transmission 504 corresponds to the sun gear 400 of the fourth gearset 334 of the transmission 304. Given those similarities, it should be understood that the transmission 504 may be substituted for the transmission 104 in the motor vehicle 100 shown in FIG. 1. In addition, the power paths defined by the architecture of the transmission 504 are identical to the power paths defined by the architecture of the transmission 104.

The first gearset 528 is configured to receive power supplied by the input shaft 510 that is transmitted to the junction 556 and thereafter to the first gearset 528. The first gearset 528 is illustratively a simple planetary gearset that includes a ring gear 570, a plurality of planet gears 572, a carrier 574, and a sun gear 576. Each of the planet gears 572 is intermeshed with the ring gear 570 and the sun gear 576, and each of the planet gears 572 is supported for rotation by the carrier 574. Power from the input shaft 510 is transmitted to the junction 556 and therefrom to the carrier 574. The sun gear 576 is coupled to the second gearset 530, and the ring gear 570 is coupled to the output shaft 512. The carrier 574 is coupled to the second gearset 530, and the second clutch 518 is engageable to couple the carrier 574 to the output shaft 512 through the ring gear 570.

The second gearset 530 is configured to receive power supplied by the input shaft 510 that is transmitted from the junction 556 to the first gearset 528 and therefrom to the second gearset 530. The second gearset 530, similar to the first gearset 528, is illustratively a simple planetary gearset that includes a ring gear 578, a plurality of planet gears 580, a carrier 582, and a sun gear 584. Each of the planet gears 580 is intermeshed with the ring gear 578 and the sun gear 584, and each of the planet gears 580 is supported for rotation by the carrier 582. The first clutch 516 is engageable to couple the ring gear 578 to a stationary, non-rotating part of the transmission 504, thereby preventing the ring gear 578 from rotating (i.e., braking the ring gear 578). For instance, the first clutch 516 may be engaged to couple the ring gear 578 to a housing of the transmission 504. The sun gear 584 is coupled to the sun gear 576 of the first gearset 528, and the carrier 582 is coupled to the carrier 574 of the first gearset 528. The carrier 582 is also coupled to the fifth gearset 536.

The third gearset 532 is configured to receive power supplied by the input shaft 510 that is transmitted to the junction 556 and therefrom to the third gearset 532. The third gearset 532 is illustratively an idler-planet planetary gearset that includes a ring gear 586, a plurality of planet gears 588 including one or more idler-planet gears, a carrier 590, and a sun gear 592. Each of the planet gears 588 is intermeshed with either the ring gear 586 or the sun gear 592 and another one of the planet gears 588, and each of the planet gears 588 is supported for rotation by the carrier 590. Power from the input shaft 510 is transmitted from the junction 556 to the ring gear 586. The carrier 590 is coupled to the input ring 538 of the variator 514, and the variator bypass clutch 526 is engageable to couple the carrier 590 to the output ring 542 of the variator 514 to bypass the variator 514 so that power is transmitted at a 1:1 ratio from the carrier 590 to the output ring 542 through the variator bypass clutch 526. The carrier 590 is coupled to fifth gearset 536, and the fifth clutch 524 is engageable to couple the carrier 590 to the fifth gearset 536. The sun gear 592 is coupled to the fourth gearset 534.

The fourth gearset 534 is configured to receive power supplied by the input shaft 510 that is transmitted from the junction 556 to the third gearset 532 and therefrom to the fourth gearset 534. The fourth gearset 534 is illustratively an idler-planet planetary gearset that includes a ring gear 594, a plurality of planet gears 596 including one or more idler-planet gears, a carrier 598, and a sun gear 600. Each of the planet gears 596 is intermeshed with either the ring gear 594 or the sun gear 600 and another one of the planet gears 596, and each of the planet gears 596 is supported for rotation by the carrier 598. The carrier 598 is coupled to a stationary, non-rotating part of the transmission 504, thereby preventing the carrier 598 from rotating (i.e., braking the carrier 598). For instance, the carrier 598 may be coupled to the housing of the transmission 504. The sun gear 600 is coupled to the output ring 542 of the variator 514, and the variator bypass clutch 526 is engageable to couple the carrier 590 of the third gearset 532 to the sun gear 600 of the fourth gearset 534 to transmit power therebetween at a 1:1 ratio (i.e., power flows directly through the variator bypass clutch 526 so that the variator 514 is bypassed). The ring gear 594 is coupled to the sun gear 592 of the third gearset 532. The fourth clutch 522 is engageable to couple the ring gear 594 to the fifth gearset 536.

The fifth gearset 536 is configured to receive power supplied by the input shaft 510 that is transmitted to the junction 556 and therefrom to the fifth gearset 536 through the first and second gearsets 528, 530. The fifth gearset 536, similar to both the first gearset 528 and the second gearset 530, is illustratively a simple planetary gearset that includes a ring gear 602, a plurality of planet gears 604, a carrier 606, and a sun gear 608. Each of the planet gears 604 is intermeshed with the ring gear 602 and the sun gear 608, and each of the planet gears 604 is supported for rotation by the carrier 606. The third clutch 620 is engageable to couple the ring gear 602 to a stationary, non-rotating part of the transmission 504, thereby preventing the ring gear 602 from rotating (i.e., braking the ring gear 602). For instance, the third clutch 620 may be engaged to couple the ring gear 602 to the housing of the transmission 504. The sun gear 608 is coupled to the carrier 590 of the third gearset 532. The carrier 606 is coupled to the carrier 582 of the second gearset 530. The fourth clutch 522 is engageable to couple the carrier 606 to the ring gear 594 of the fourth gearset 534, and the fifth clutch 524 is engageable to couple the carrier 606 to the carrier 590 of the third gearset 532.

Referring now to FIGS. 8-24, power flow from the input shaft 110 to the output shaft 112 of the transmission 104 is illustrated in each of the operating modes discussed above. Beginning with "Mode 1" of table 160, power flows from the input shaft 110 to the output shaft 110 of the transmission 104 as shown in FIG. 8. Input power 700 (designated by the solid arrows) flows from the input shaft 110 to the junction 156 and thereafter to the third gearset 132. Input power 700 flowing to the third gearset 132 is modified by the "mixing" gearset 132 such that some of input power 700 flows thereafter directly to the junction 161 and some of input power 700 flows to the junction 161 through the variator 114 as discussed below. After input power 700 has been reconstituted at the junction 161, input power 700 is transmitted to the first gearset 128 through the junctions 162, 163, 159, 157, the second gearset 130, and the fifth clutch 124. Input power 700 reaching the first gearset 128 is modified by the "mixing" gearset 128 such that some of the input power 700 reaching the first gearset 128 is transmitted to the output shaft 112 and some of the input power 700 reaching the first gearset 128 is transmitted back to the junction 156, as described in greater detail below.

As shown in FIG. 8, the power transmitted from the third gearset 132 to the junction 161 has been designated input power 701 (shown in dashed). Input power 701 is transmitted from the third gearset 132 to the junction 160 and thereafter to the junction 161 through the variator 114 and the fourth gearset 134. In addition, input power 701 is transmitted from the third gearset 132 directly to the junction 161 so that input power 700 is reconstituted at the junction 161. The variator 114 is subjected only to the input power 701 flowing from the junction 160 to the junction 161 (i.e., the variator 114 is not subjected to the entire input power 701 output from the third gearset 132).

Recirculated power 702 (designated by the dotted arrows) is recirculated from the first gearset 128 back to the junction 156 as shown in FIG. 8. At the junction 156, recirculated power 702 is combined with input power 700 received from the input shaft 110. Recirculated power 702 then flows in parallel with input power 700 from the junction 156 to the first gearset 128 through the third gearset 132, the junctions 161, 162, 163, 159, 157, the second gearset 130, and the fifth clutch 124 in identical fashion to input power 700. Hereafter, the combination of input power 700 and recirculated power 702 is referred to as "combined power" and is understood to be greater than input power 700 and recirculated power 702.

The "mixing" gearset 132 breaks up the combined power into split power 703 (designated by the slashed arrows), which is transmitted in parallel with input power 701 from the third gearset 132 directly to the junction 161 and from the third gearset 132 to the junction 161 through the variator 114 in identical fashion to input power 701. As such, like input power 700, combined power is reconstituted at the junction 161. Combined power is then transmitted from the junction 161 to the first gearset 128 in identical fashion to input power 700.

The "mixing" gearset 128 breaks up the combined power into split power 705 (designated by the backslashed arrows), which is transmitted to the output shaft 112 and the back to the junction 156, as shown in FIG. 8. In this way, some split power 705 flows from the first gearset 128 to the output shaft 112 (like input power 700), thereby adding to the power transmitted to the output shaft 112. Some split power 705 also flows from the first gearset 128 to the junction 156 and, like recirculated power 702, back through the third gearset 132 to the first gearset 128 in parallel with input power 700.

Turning to the "Bypass 1" mode of table 160, power flows from the input shaft 110 to the output shaft 110 of the transmission 104 as shown in FIG. 9. Input power 700 (designated by the solid arrows) flows from the input shaft 110 to the junction 156 and thereafter to the third gearset 132. Input power 700 flowing to the third gearset 132 is modified by the "mixing" gearset 132 such that some of input power 700 flows thereafter directly to the junction 161 and some of input power 700 flows to the junction 161 through the variator bypass clutch 126 as discussed below. After input power 700 has been reconstituted at the junction 161, input power 700 is transmitted to the first gearset 128 through the junctions 162, 163, 159, 157, the second gearset 130, and the fifth clutch 124. Input power 700 reaching the first gearset 128 is modified by the "mixing" gearset 128 such that some of the input power 700 reaching the first gearset 128 is transmitted to the output shaft 112 and some of the input power 700 reaching the first gearset 128 is transmitted back to the junction 156, as described in greater detail below.

As shown in FIG. 9, the power transmitted from the third gearset 132 to the junction 161 has been designated input power 701 (shown in dashed). Input power 701 is transmitted from the third gearset 132 to the junction 160 and thereafter to the junction 161 through the variator bypass clutch 126 and the fourth gearset 134. In addition, input power 701 is transmitted from the third gearset 132 directly to the junction 161 so that input power 700 is reconstituted at the junction 161.

Recirculated power 702 (designated by the dotted arrows) is recirculated from the first gearset 128 back to the junction 156 as shown in FIG. 9. At the junction 156, recirculated power 702 is combined with input power 700 received from the input shaft 110. Recirculated power 702 then flows in parallel with input power 700 from the junction 156 to the first gearset 128 through the third gearset 132, the junctions 161, 162, 163, 159, 157, the second gearset 130, and the fifth clutch 124 in identical fashion to input power 700. Hereafter, the combination of input power 700 and recirculated power 702 is referred to as "combined power" and is understood to be greater than input power 700 and recirculated power 702.

The "mixing" gearset 132 breaks up the combined power into split power 703 (designated by the slashed arrows), which is transmitted in parallel with input power 701 from the third gearset 132 directly to the junction 161 and from the third gearset 132 to the junction 161 through the variator bypass clutch 126 in identical fashion to input power 701. As such, like input power 700, combined power is reconstituted at the junction 161. Combined power is then transmitted from the junction 161 to the first gearset 128 in identical fashion to input power 700.

The "mixing" gearset 128 breaks up the combined power into split power 705 (designated by the backslashed arrows), which is transmitted to the output shaft 112 and the back to the junction 156, as shown in FIG. 9. In this way, some split power 705 flows from the first gearset 128 to the output shaft 112 (like input power 700), thereby adding to the power transmitted to the output shaft 112. Some split power 705 also flows from the first gearset 128 to the junction 156 and, like recirculated power 702, back through the third gearset 132 to the first gearset 128 in parallel with input power 700.

Turning to the "Sync 1-2" mode of table 160, power flows from the input shaft 110 to the output shaft 110 of the transmission 104 as shown in FIG. 10. Input power 700 (designated by the solid arrows) flows from the input shaft 110 to the junction 156 and thereafter to the third gearset 132. Input power 700 flowing to the third gearset 132 is modified by the "mixing" gearset 132 such that some of input power 700 flows to the junction 163 through the fourth clutch 122 and some of input power 700 flows to the junction 163 through the fifth clutch 124 as discussed below. After input power 700 has been reconstituted at the junction 163, input power 700 is transmitted to the first gearset 128 through the junctions 159, 157 and the second gearset 130. Input power 700 reaching the first gearset 128 is modified by the "mixing" gearset 128 such that some of the input power 700 reaching the first gearset 128 is transmitted to the output shaft 112 and some of the input power 700 reaching the first gearset 128 is transmitted back to the junction 156, as described in greater detail below.

As shown in FIG. 10, the power transmitted from the third gearset 132 to the junction 163 has been designated input power 701 (shown in dashed). Input power 701 is transmitted from the third gearset 132 to the junction 163 through the junction 160 and the fourth clutch 122. In addition, input power 701 is transmitted from the third gearset 132 to the junction 163 through the junctions 161, 162 and the fifth clutch 124 so that input power 700 is reconstituted at the junction 163.

Recirculated power 702 (designated by the dotted arrows) is recirculated from the first gearset 128 back to the junction 156 as shown in FIG. 10. At the junction 156, recirculated power 702 is combined with input power 700 received from the input shaft 110. Recirculated power 702 then flows in parallel with input power 700 from the junction 156 to the first gearset 128 through the third gearset 132, the second gearset 130, and the junctions 163, 159, 157 in identical fashion to input power 700. Hereafter, the combination of input power 700 and recirculated power 702 is referred to as "combined power" and is understood to be greater than input power 700 and recirculated power 702.

The "mixing" gearset 132 breaks up the combined power into split power 703 (designated by the slashed arrows), which is transmitted in parallel with input power 701 from the third gearset 132 to the junction 163 through the fourth clutch 122 and from the third gearset 132 to the junction 163 through the fifth clutch 124 in identical fashion to input power 701. As such, like input power 700, combined power is reconstituted at the junction 163. Combined power is then transmitted from the junction 163 to the first gearset 128 in identical fashion to input power 700.

The "mixing" gearset 128 breaks up the combined power into split power 705 (designated by the backslashed arrows), which is transmitted to the output shaft 112 and the back to the junction 156, as shown in FIG. 10. In this way, some split power 705 flows from the first gearset 128 to the output shaft 112 (like input power 700), thereby adding to the power transmitted to the output shaft 112. Some split power 705 also flows from the first gearset 128 to the junction 156 and, like recirculated power 702, back through the third gearset 132 to the first gearset 128 in parallel with input power 700.

Turning now to "Mode 2" of table 160, power flows from the input shaft 110 to the output shaft 110 of the transmission 104 as shown in FIG. 11. Input power 700 (designated by the solid arrows) flows from the input shaft 110 to the junction 156 and thereafter to the first gearset 128 as shown in FIG. 11. Input power 700 flowing to the first gearset 128 is modified by the "mixing" gearset 128 such that some of input power 700 flows to the output shaft 112 through the junction 158 and some of input power 700 flows to the junction 156, as described in greater detail below.

Recirculated power 702 (designated by the dotted arrows) is recirculated from the first gearset 128 back to the junction 160 as shown in FIG. 11. Specifically, recirculated power 702 flows from the first gearset 128 to the junction 156 through the junctions 157, 159, 163, the second gearset 130, and the fourth clutch 122 as shown in FIG. 11. As discussed below, the junction 160 splits recirculated power 702 so that recirculated power 702 becomes split recirculated power 704, and split recirculated power 704 is transmitted from the junction 160 to the third gearset 132 such that recirculated power 702 is reconstituted at the third gearset 132. After recirculated power 702 has been reconstituted at the third gearset 132, recirculated power 702 flows to the junction 156. At the junction 156, recirculated power 702 is combined with input power 700 received from the input shaft 110. Recirculated power 702 then flows in parallel with input power 700 from the junction 156 to the first gearset 128 in identical fashion to input power 700. Hereafter, the combination of input power 700 and recirculated power 702 is referred to as "combined power" and is understood to be greater than input power 700 and recirculated power 702.

Split recirculated power 704 (designated by the "x" arrows) flows from the junction 160 directly to the third gearset 132, and also from the junction 160 to the junction 161 through the fourth gearset 134 and the variator 114 as shown in FIG. 11. As a result, the variator 114 is subjected to only a portion of the recirculated power 702 (i.e., split recirculated power 704) transmitted to the junction 160. As indicated above, the split recirculated power 704 flowing directly from the junction 160 to the third gearset 132 is combined with the split recirculated power 704 flowing through the variator 114 such that recirculated power 702 is reconstituted at the third gearset 132.

The "mixing" gearset 128 breaks up the combined power into split power 705 (designated by the backslashed arrows), which is transmitted to the output shaft 112 and back to the junction 156, as shown in FIG. 11. In this way, some split power 705 flows from the first gearset 128 to the output shaft 112 (like input power 700), thereby adding to the power transmitted to the output shaft 112. Some split power 705 also flows from the first gearset 128 to the junction 156 through the gearsets 130, 132, the fourth clutch 122, and the junctions 157, 159, 163, 160 and, like recirculated power 702, back through the first gearset 128 in parallel with input power 700.

The junction 160 divides the split power 705 transmitted thereto from the first gearset 128 into split power 703 (designated by the slashed arrows) as shown in FIG. 11. Split power 703 is transmitted from the junction 160 to the third gearset 132 in parallel with split recirculated power 704 in identical fashion to split recirculated power 704. As such, split power 705 is reconstituted at the third gearset 132, and split power 705 reconstituted at the third gearset 132 flows thereafter to the junction 156 as shown in FIG. 11.

Figure 12:
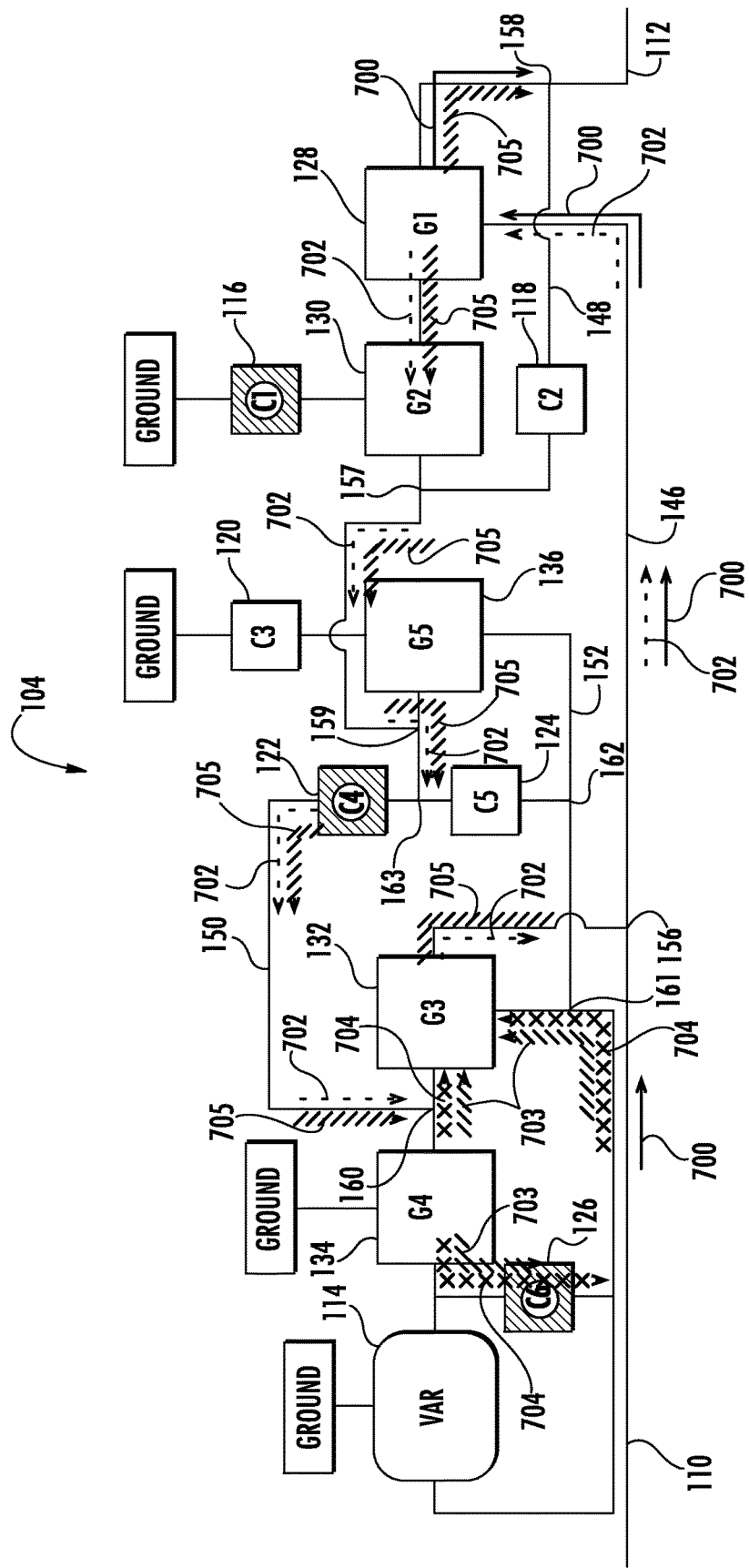
FIG. 12 is a block diagrammatic view of the infinitely variable transmission of FIG. 3 showing power flow therethrough in a second variator bypass operating mode.

Turning now to the "Bypass 2" mode of table 160, power flows from the input shaft 110 to the output shaft 110 of the transmission 104 as shown in FIG. 12. Input power 700 (designated by the solid arrows) flows from the input shaft 110 to the junction 156 and thereafter to the first gearset 128 as shown in FIG. 12. Input power 700 flowing to the first gearset 128 is modified by the "mixing" gearset 128 such that some of input power 700 flows to the output shaft 112 through the junction 158 and some of input power 700 flows to the junction 156, as described in greater detail below.

Recirculated power 702 (designated by the dotted arrows) is recirculated from the first gearset 128 back to the junction 160 as shown in FIG. 12. Specifically, recirculated power 702 flows from the first gearset 128 to the junction 156 through the junctions 157, 159, 163, the second gearset 130, and the fourth clutch 122 as shown in FIG. 12. As discussed below, the junction 160 splits recirculated power 702 so that recirculated power 702 becomes split recirculated power 704, and split recirculated power 704 is transmitted from the junction 160 to the third gearset 132 such that recirculated power 702 is reconstituted at the third gearset 132. After recirculated power 702 has been reconstituted at the third gearset 132, recirculated power 702 flows to the junction 156. At the junction 156, recirculated power 702 is combined with input power 700 received from the input shaft 110. Recirculated power 702 then flows in parallel with input power 700 from the junction 156 to the first gearset 128 in identical fashion to input power 700. Hereafter, the combination of input power 700 and recirculated power 702 is referred to as "combined power" and is understood to be greater than input power 700 and recirculated power 702.

Split recirculated power 704 (designated by the "x" arrows) flows from the junction 160 directly to the third gearset 132, and also from the junction 160 to the junction 161 through the fourth gearset 134 and the variator bypass clutch 126 as shown in FIG. 12. As indicated above, the split recirculated power 704 flowing directly from the junction 160 to the third gearset 132 is combined with the split recirculated power 704 flowing through the variator bypass clutch 126 such that recirculated power 702 is reconstituted at the third gearset 132.

The "mixing" gearset 128 breaks up the combined power into split power 705 (designated by the backslashed arrows), which is transmitted to the output shaft 112 and back to the junction 156, as shown in FIG. 12. In this way, some split power 705 flows from the first gearset 128 to the output shaft 112 (like input power 700), thereby adding to the power transmitted to the output shaft 112. Some split power 705 also flows from the first gearset 128 to the junction 156 through the gearsets 130, 132, the fourth clutch 122, and the junctions 157, 159, 163, 160 and, like recirculated power 702, back through the first gearset 128 in parallel with input power 700.

The junction 160 divides the split power 705 transmitted thereto from the first gearset 128 into split power 703 (designated by the slashed arrows) as shown in FIG. 12. Split power 703 is transmitted from the junction 160 to the third gearset 132 in parallel with split recirculated power 704 in identical fashion to split recirculated power 704. As such, split power 705 is reconstituted at the third gearset 132, and split power 705 reconstituted at the third gearset 132 flows thereafter to the junction 156 as shown in FIG. 12.

Turning now to the "Sync 2-3" mode of table 160, power flows from the input shaft 110 to the output shaft 112 of the transmission 104 as shown in FIG. 13. Input power 700 (designated by the solid arrows) flows from the input shaft 110 to the junction 156 and thereafter to the first gearset 128 as shown in FIG. 13. Input power 700 flowing to the first gearset 128 is modified by the "mixing" gearset 128 such that some of input power 700 flows to the output shaft 112 through the junction 158 and some of input power 700 flows to the junction 159, as described in greater detail below.

Recirculated power 702 (designated by the dotted arrows) is recirculated from the first gearset 128 back to the junction 159 as shown in FIG. 13. Specifically, recirculated power 702 flows from the first gearset 128 to the junction 159 through the junction 157 and the second gearset 130 as shown in FIG. 13. As discussed below, the junction 159 splits recirculated power 702 so that recirculated power 702 becomes split recirculated power 704, and split recirculated power 704 is transmitted from the junction 159 to the third gearset 132 such that recirculated power 702 is reconstituted at the third gearset 132. After recirculated power 702 has been reconstituted at the third gearset 132, recirculated power 702 flows to the junction 156. At the junction 156, recirculated power 702 is combined with input power 700 received from the input shaft 110. Recirculated power 702 then flows in parallel with input power 700 from the junction 156 to the first gearset 128 in identical fashion to input power 700. Hereafter, the combination of input power 700 and recirculated power 702 is referred to as "combined power" and is understood to be greater than input power 700 and recirculated power 702.

Split recirculated power 704 (designated by the "x" arrows) flows from the junction 159 to the third gearset 132 through the fourth clutch 122 and the junction 160. In addition, split recirculated power 704 flows from the junction 159 to the third gearset 132 through the fifth gearset 136 and the junctions 162, 161. As indicated above, the split recirculated power 704 flowing to the third gearset 132 through the fourth clutch 122 is combined with the split recirculated power 704 flowing to the third gearset 132 through the fifth gearset 136 such that recirculated power 702 is reconstituted at the third gearset 132.

The "mixing" gearset 128 breaks up the combined power into split power 705 (designated by the backslashed arrows), which is transmitted to the output shaft 112 and back to the junction 156, as shown in FIG. 13. In this way, some split power 705 flows from the first gearset 128 to the output shaft 112 (like input power 700), thereby adding to the power transmitted to the output shaft 112. Some split power 705 also flows from the first gearset 128 to the junction 156 through the gearsets 130, 132 and the junctions 157, 159 and, like recirculated power 702, back through the first gearset 128 in parallel with input power 700.

The junction 159 divides the split power 705 transmitted thereto from the first gearset 128 into split power 703 (designated by the slashed arrows) as shown in FIG. 13. Split power 703 is transmitted from the junction 159 to the third gearset 132 in parallel with split recirculated power 704 in identical fashion to split recirculated power 704. As such, split power 705 is reconstituted at the third gearset 132, and split power 705 reconstituted at the third gearset 132 flows thereafter to the junction 156 as shown in FIG. 13.

Turning now to "Mode 3" of table 160, power flow from the input shaft 110 to the output shaft 112 of the transmission 104 is shown in FIG. 14. Input power 700 (designated by the solid arrows) flows from the input shaft 110 to the junction 156 and thereafter to the first gearset 128 as shown in FIG. 14. Input power 700 flowing to the first gearset 128 is modified by the "mixing" gearset 128 such that some of input power 700 flows to the output shaft 112 through the junction 158 and some of input power 700 flows to the junction 156, as described in greater detail below.

Recirculated power 702 (designated by the dotted arrows) is recirculated from the first gearset 128 back to the junction 161 as shown in FIG. 14. Specifically, recirculated power 702 flows from the first gearset 128 to the junction 161 through the junctions 157, 159, 162, the second gearset 130, and the fifth gearset 136 as shown in FIG. 14. As discussed below, the junction 161 splits recirculated power 702 so that recirculated power 702 becomes split recirculated power 704, and split recirculated power 704 is transmitted from the junction 161 to the third gearset 132 such that recirculated power 702 is reconstituted at the third gearset 132. After recirculated power 702 has been reconstituted at the third gearset 132, recirculated power 702 flows to the junction 156. At the junction 156, recirculated power 702 is combined with input power 700 received from the input shaft 110. Recirculated power 702 then flows in parallel with input power 700 from the junction 156 to the first gearset 128 in identical fashion to input power 700. Hereafter, the combination of input power 700 and recirculated power 702 is referred to as "combined power" and is understood to be greater than input power 700 and recirculated power 702.

Split recirculated power 704 (designated by the "x" arrows) flows from the junction 161 directly to the third gearset 132, and also from the junction 161 to the third gearset 132 through the fourth gearset 134 and the variator 114 as shown in FIG. 14. As a result, the variator 114 is subjected to only a portion of the recirculated power 702 (i.e., split recirculated power 704) transmitted to the third gearset 132. As indicated above, the split recirculated power 704 flowing directly from the junction 161 to the third gearset 132 is combined with the split recirculated power 704 flowing to the third gearset 132 through the variator 114 such that recirculated power 702 is reconstituted at the third gearset 132.

The "mixing" gearset 128 breaks up the combined power into split power 705 (designated by the backslashed arrows), which is transmitted to the output shaft 112 and back to the junction 156, as shown in FIG. 14. In this way, some split power 705 flows from the first gearset 128 to the output shaft 112 (like input power 700), thereby adding to the power transmitted to the output shaft 112. Some split power 705 also flows from the first gearset 128 to the junction 156 through the gearsets 130, 132, 136 and the junctions 157, 159, 162 and, like recirculated power 702, back through the first gearset 128 in parallel with input power 700.

The junction 161 divides the split power 705 transmitted thereto from the first gearset 128 into split power 703 (designated by the slashed arrows) as shown in FIG. 14. Split power 703 is transmitted from the junction 161 to the third gearset 132 in parallel with split recirculated power 704 in identical fashion to split recirculated power 704. As such, split power 705 is reconstituted at the third gearset 132, and split power 705 reconstituted at the third gearset 132 flows thereafter to the junction 156 as shown in FIG. 14.

Turning now to the "Bypass 3" mode of table 160, power flow from the input shaft 110 to the output shaft 112 of the transmission 104 is shown in FIG. 15. Input power 700 (designated by the solid arrows) flows from the input shaft 110 to the junction 156 and thereafter to the first gearset 128 as shown in FIG. 15. Input power 700 flowing to the first gearset 128 is modified by the "mixing" gearset 128 such that some of input power 700 flows to the output shaft 112 through the junction 158 and some of input power 700 flows to the junction 156, as described in greater detail below.

Recirculated power 702 (designated by the dotted arrows) is recirculated from the first gearset 128 back to the junction 161 as shown in FIG. 15. Specifically, recirculated power 702 flows from the first gearset 128 to the junction 161 through the junctions 157, 159, 162, the second gearset 130, and the fifth gearset 136 as shown in FIG. 15. As discussed below, the junction 161 splits recirculated power 702 so that recirculated power 702 becomes split recirculated power 704, and split recirculated power 704 is transmitted from the junction 161 to the third gearset 132 such that recirculated power 702 is reconstituted at the third gearset 132. After recirculated power 702 has been reconstituted at the third gearset 132, recirculated power 702 flows to the junction 156. At the junction 156, recirculated power 702 is combined with input power 700 received from the input shaft 110. Recirculated power 702 then flows in parallel with input power 700 from the junction 156 to the first gearset 128 in identical fashion to input power 700. Hereafter, the combination of input power 700 and recirculated power 702 is referred to as "combined power" and is understood to be greater than input power 700 and recirculated power 702.

Split recirculated power 704 (designated by the "x" arrows) flows from the junction 161 directly to the third gearset 132, and also from the junction 161 to the third gearset 132 through the fourth gearset 134 and the variator bypass clutch 126 as shown in FIG. 15. As indicated above, the split recirculated power 704 flowing directly from the junction 161 to the third gearset 132 is combined with the split recirculated power 704 flowing to the third gearset 132 through the variator bypass clutch 126 such that recirculated power 702 is reconstituted at the third gearset 132.

The "mixing" gearset 128 breaks up the combined power into split power 705 (designated by the backslashed arrows), which is transmitted to the output shaft 112 and back to the junction 156, as shown in FIG. 15. In this way, some split power 705 flows from the first gearset 128 to the output shaft 112 (like input power 700), thereby adding to the power transmitted to the output shaft 112. Some split power 705 also flows from the first gearset 128 to the junction 156 through the gearsets 130, 132, 136 and the junctions 157, 159, 162 and, like recirculated power 702, back through the first gearset 128 in parallel with input power 700.

The junction 161 divides the split power 705 transmitted thereto from the first gearset 128 into split power 703 (designated by the slashed arrows) as shown in FIG. 15. Split power 703 is transmitted from the junction 161 to the third gearset 132 in parallel with split recirculated power 704 in identical fashion to split recirculated power 704. As such, split power 705 is reconstituted at the third gearset 132, and split power 705 reconstituted at the third gearset 132 flows thereafter to the junction 156 as shown in FIG. 15.

Figure 16:
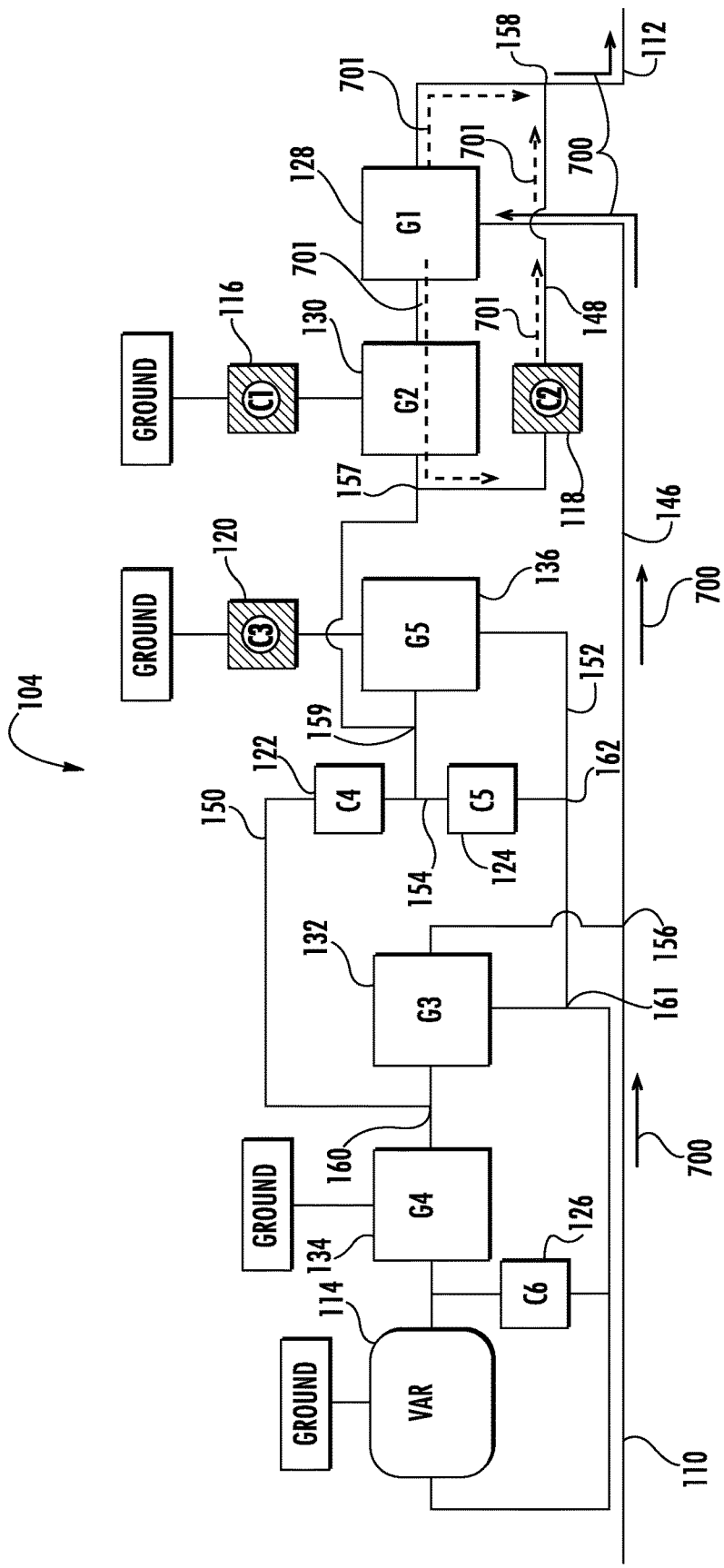
FIG. 16 is a block diagrammatic view of the infinitely variable transmission of FIG. 3 showing power flow therethrough in a third synchronous operating mode.

Turning now to the "Sync 3-4" mode of table 160, power flows from the input shaft 110 to the output shaft 112 of the transmission 104 as shown in FIG. 16. Input power 700 (designated by the solid arrows) flows from the input shaft 110 to the junction 156 and thereafter to the first gearset 128 as shown in FIG. 16. Input power 700 flowing to the first gearset 128 is modified by the "mixing" gearset 128 such that some of the power that is output from the first gearset 128 flows directly to the junction 158 and some of the power flows to the junction 158 through the second clutch 118 as shown in FIG. 16.

As shown in FIG. 16, the power flowing from the first gearset 128 to the junction 158 is designated input power 701 (shown in dashed). Input power 701 flows directly from the first gearset 128 to the junction 158, and input power 701 also flows from the first gearset 128 to the junction 158 through the second gearset 130, the junction 157, and the second clutch 118. Input power 700, therefore, is reconstituted at the junction 158 and transmitted thereafter to the output shaft 112. As shown in FIG. 16, the variator 114 is entirely bypassed and receives no power load.

Figure 17:
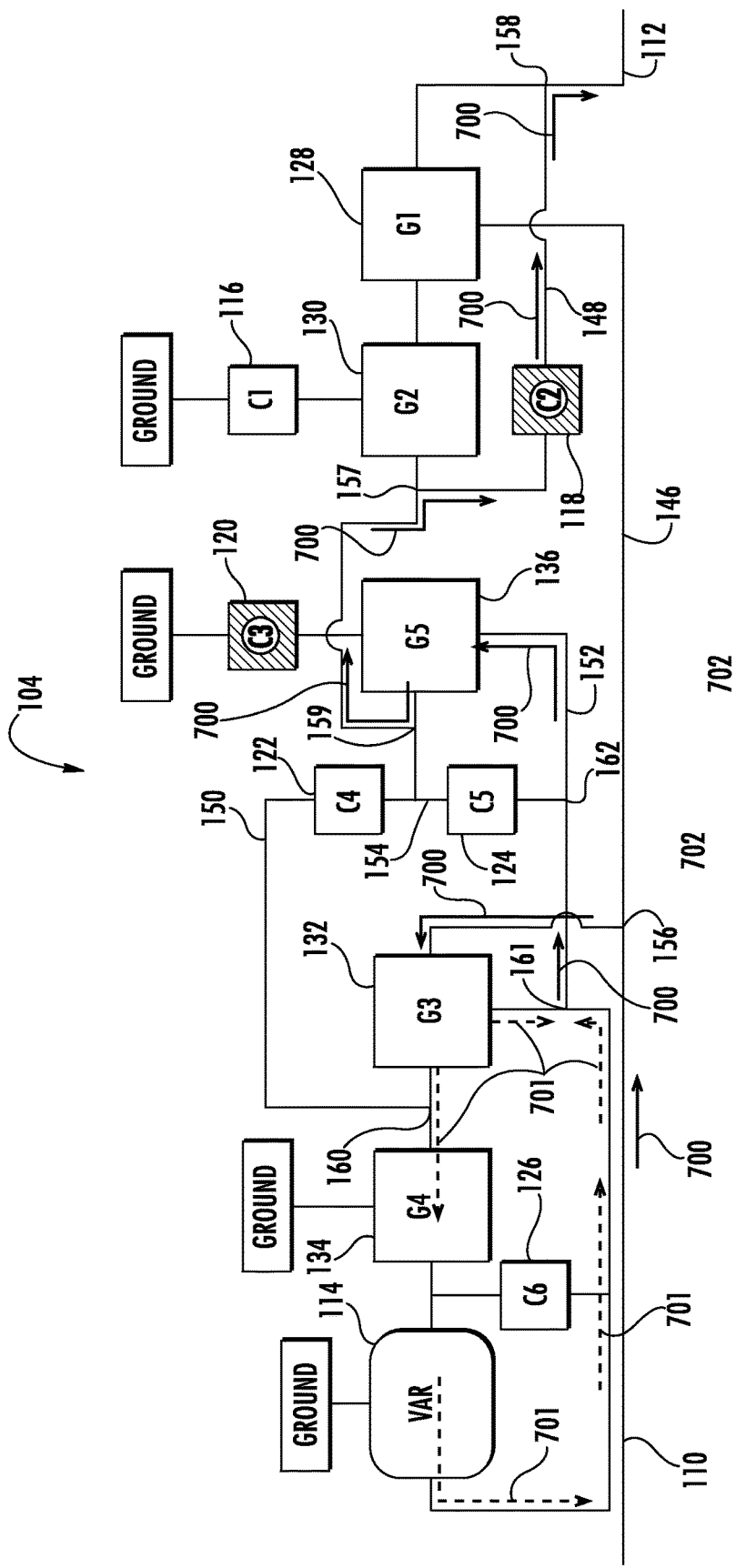
FIG. 17 is a block diagrammatic view of the infinitely variable transmission of FIG. 3 showing power flow therethrough in a fourth operating mode.

Turning now to "Mode 4" of table 160, power flows from the input shaft 110 to the output shaft 112 of the transmission 104 as shown in FIG. 17. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows directly to the junction 161 and some of the power flows to the junction 161 through the variator 114 as shown in FIG. 17. From the junction 161, input power 700 flows to the junction 158 and thereafter to the output shaft 112 through the fifth gearset 136, the second clutch 118, and the junctions 162, 159, 157.

As shown in FIG. 17, the power flowing from the third gearset 132 to the junction 161 is designated input power 701 (shown in dashed). Input power 701 flows directly from the third gearset 132 to the junction 161, and input power 701 also flows from the third gearset 132 to the junction 161 through the fourth gearset 134 and the variator 114. Input power 700, therefore, is reconstituted at the junction 161 and transmitted thereafter to the output shaft 112 as indicated above.

Figure 18:
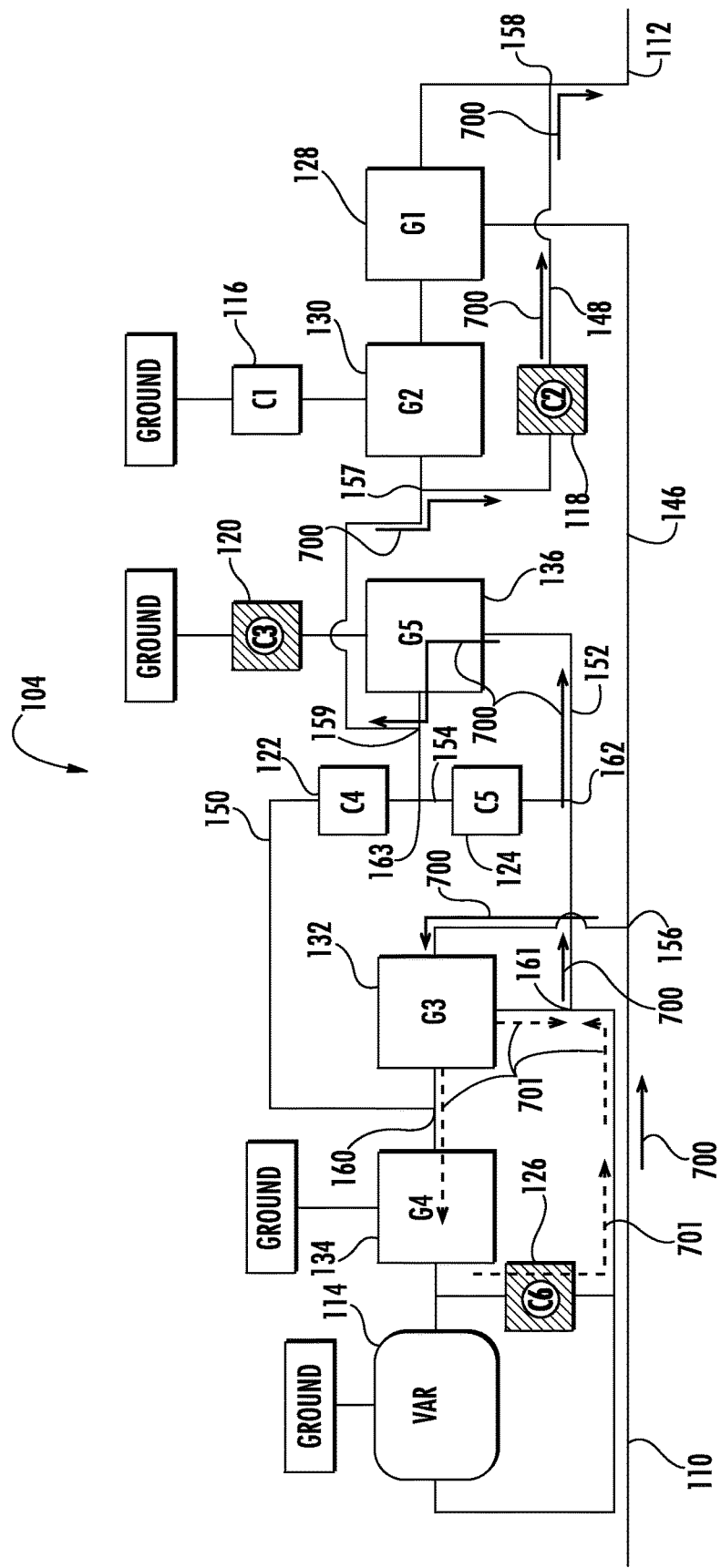
FIG. 18 is a block diagrammatic view of the infinitely variable transmission of FIG. 3 showing power flow therethrough in a fourth variator bypass operating mode.

Turning now to the "Bypass 4" mode of table 160, power flows from the input shaft 110 to the output shaft 112 of the transmission 104 as shown in FIG. 18. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows directly to the junction 161 and some of the power flows to the junction 161 through the variator bypass clutch 126 as shown in FIG. 18. From the junction 161, input power 700 flows to the junction 158 and thereafter to the output shaft 112 through the fifth gearset 136, the second clutch 118, and the junctions 162, 159, 157.

As shown in FIG. 18, the power flowing from the third gearset 132 to the junction 161 is designated input power 701 (shown in dashed). Input power 701 flows directly from the third gearset 132 to the junction 161, and input power 701 also flows from the third gearset 132 to the junction 161 through the fourth gearset 134 and the variator bypass clutch 126. Input power 700, therefore, is reconstituted at the junction 161 and transmitted thereafter to the output shaft 112 as indicated above.

Figure 19:
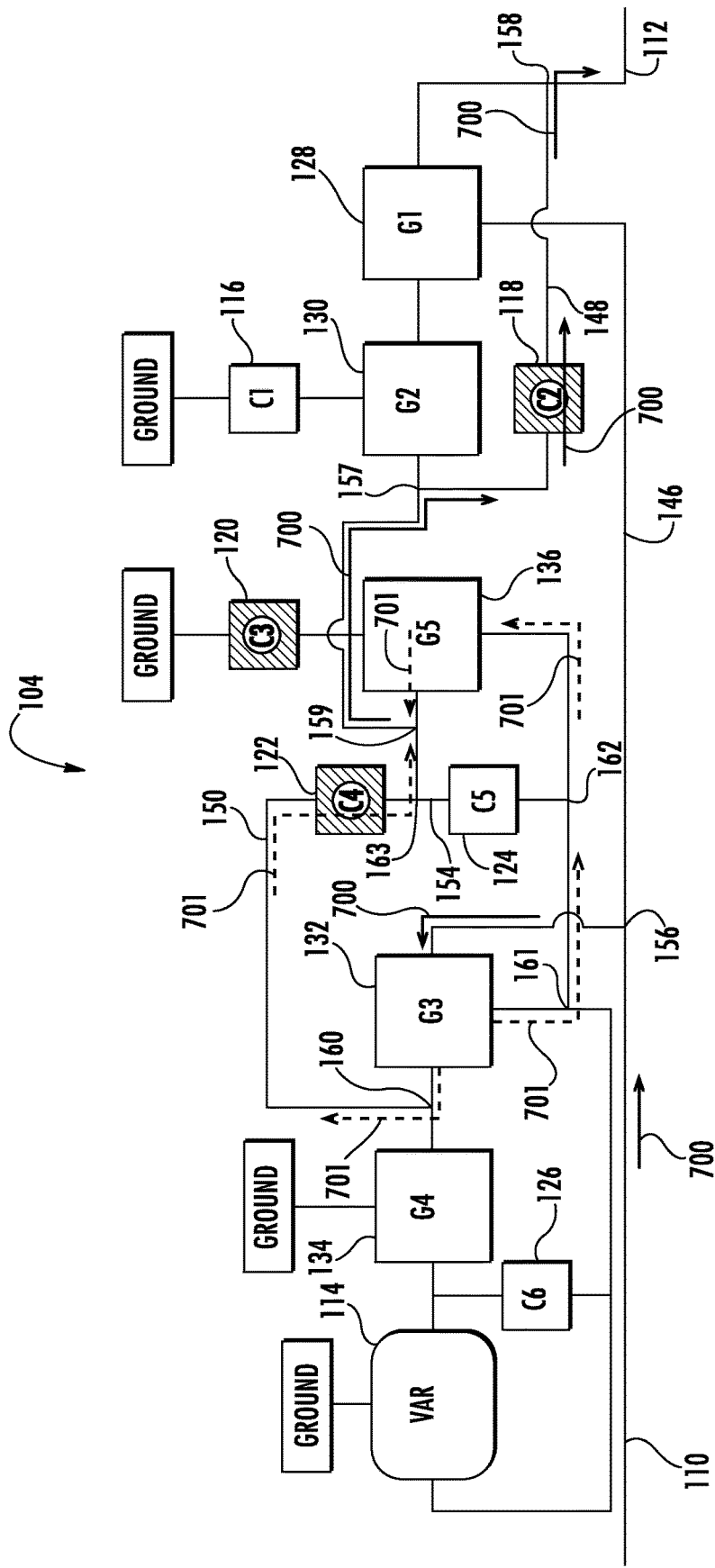
FIG. 19 is a block diagrammatic view of the infinitely variable transmission of FIG. 3 showing power flow therethrough in a fourth synchronous operating mode.

Turning now to the "Sync 4-5" mode of table 160, power flows from the input shaft 110 to the output shaft 112 of the transmission 104 as shown in FIG. 19. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows to the junction 159 through the fifth gearset 136 and some of the power flows to the junction 159 through the fourth clutch 122 as shown in FIG. 19. From the junction 159, input power 700 flows to the junction 158 and thereafter to the output shaft 112 through the second clutch 118 and the junction 157.

As shown in FIG. 19, the power flowing from the third gearset 132 to the junction 159 is designated input power 701 (shown in dashed). Input power 701 flows from the third gearset 132 to the junction 159 through the junctions 161, 162 and the fifth gearset 136, and input power 701 also flows from the third gearset 132 to the junction 159 through the junction 160 and the fourth clutch 122. Input power 700, therefore, is reconstituted at the junction 159 and transmitted thereafter to the output shaft 112 as indicated above. The variator 114 is entirely bypassed and receives no power load in the "Sync 4-5" operating mode.

Figure 20:
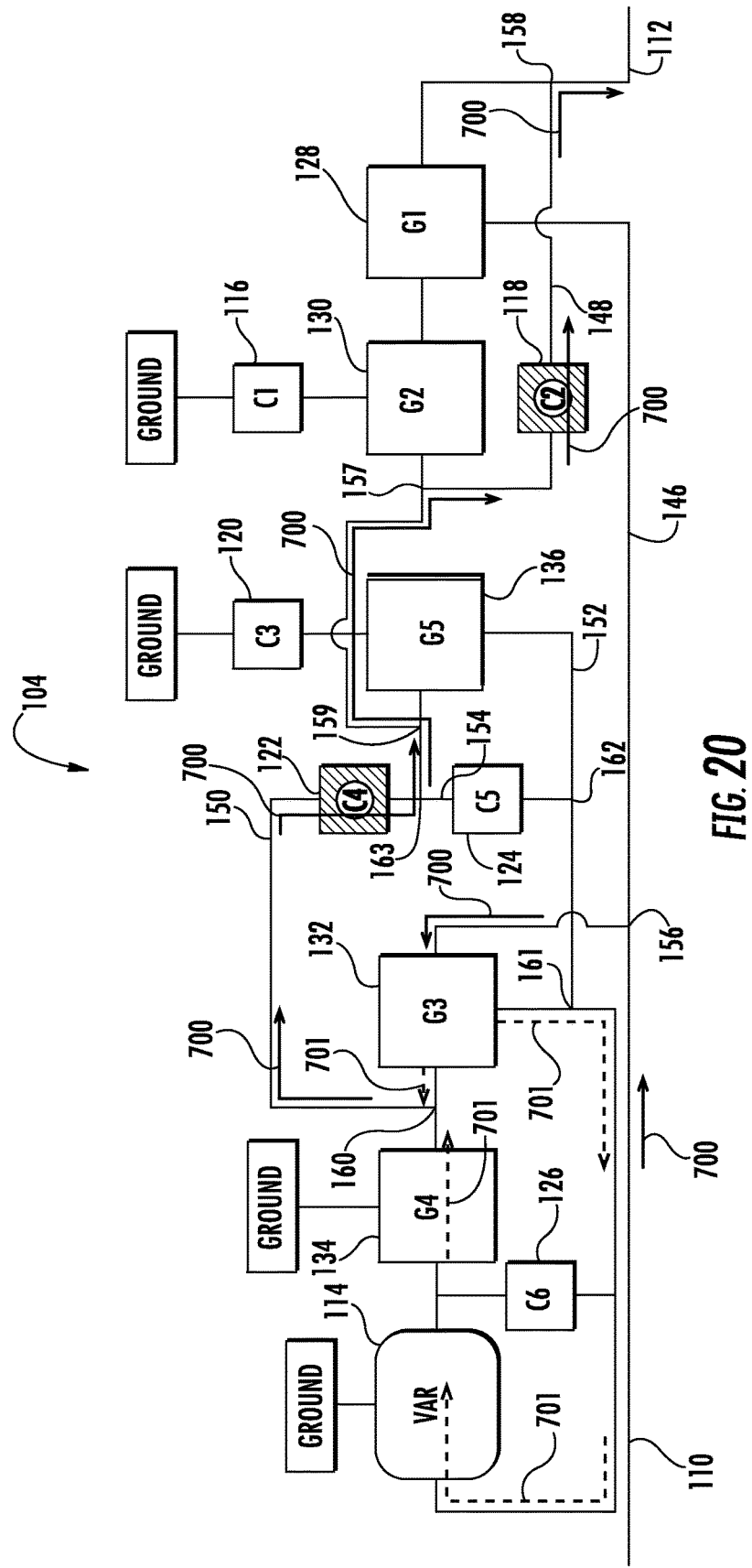
FIG. 20 is a block diagrammatic view of the infinitely variable transmission of FIG. 3 showing power flow therethrough in a fifth operating mode.

Turning now to "Mode 5" of table 160, power flows from the input shaft 110 to the output shaft 112 of the transmission 104 as shown in FIG. 20. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows directly to the junction 160 and some of the power flows to the junction 160 through the variator 114. From the junction 160, input power 700 flows to the junction 158 and thereafter to the output shaft 112 through the clutches 122, 118 and the junctions 163, 159, 157.

As shown in FIG. 20, the power flowing from the third gearset 132 to the junction 160 is designated input power 701 (shown in dashed). Input power 701 flows from the third gearset 132 directly to the junction 160, and input power 701 also flows from the third gearset 132 to the junction 160 through the variator 114 and the fourth gearset 134. Input power 700, therefore, is reconstituted at the junction 160 and transmitted thereafter to the output shaft 112 as indicated above. The variator 114 is subjected only to the split power 701 flowing through the fourth gearset 134 as shown in FIG. 20.

Figure 21:
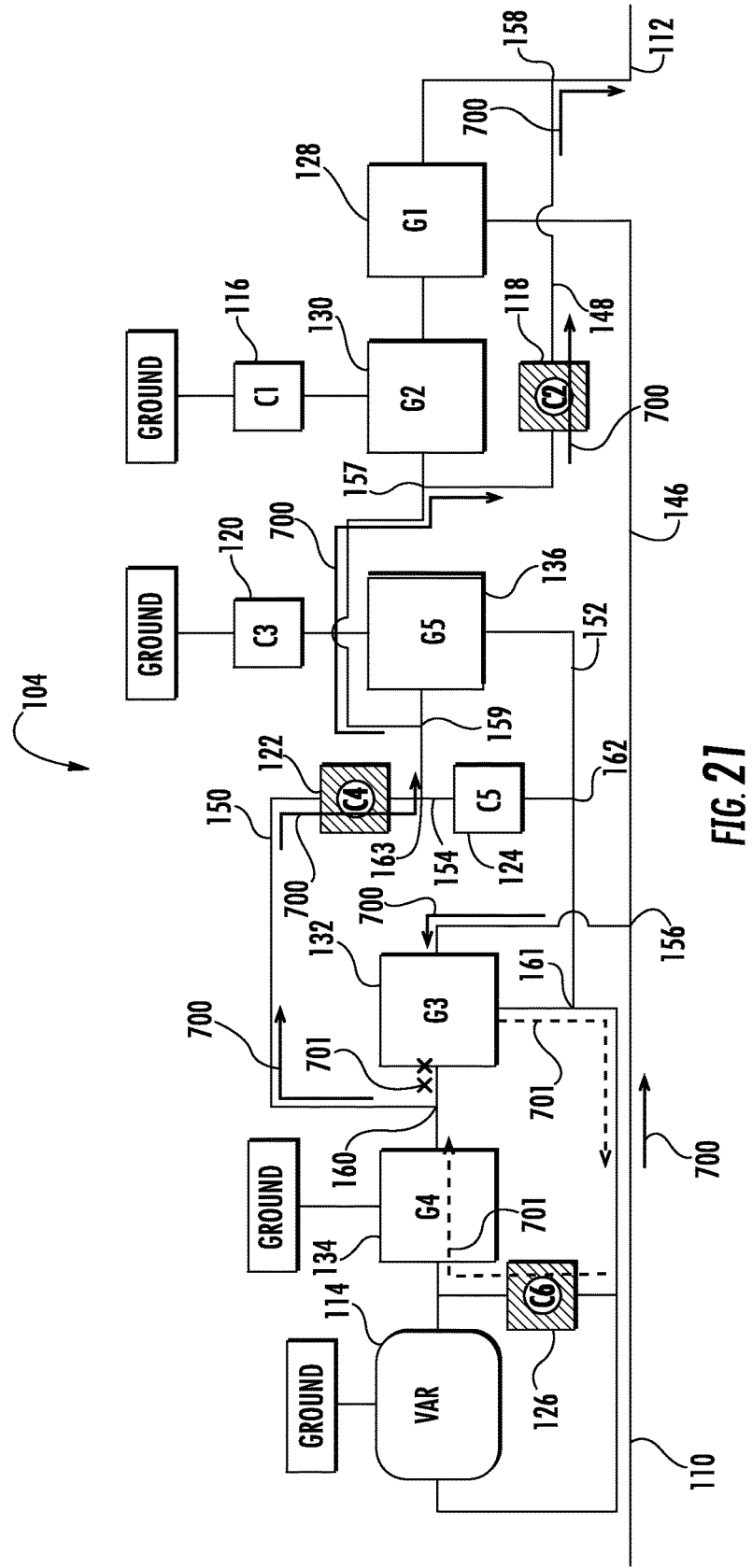
FIG. 21 is a block diagrammatic view of the infinitely variable transmission of FIG. 3 showing power flow therethrough in a fifth variator bypass operating mode.

Turning now to the "Bypass 5" mode of table 160, power flows from the input shaft 110 to the output shaft 112 of the transmission 104 as shown in FIG. 21. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows directly to the junction 160 and some of the power flows to the junction 160 through the variator bypass clutch 126. From the junction 160, input power 700 flows to the junction 158 and thereafter to the output shaft 112 through the clutches 122, 118 and the junctions 163, 159, 157.

As shown in FIG. 21, the power flowing from the third gearset 132 to the junction 160 is designated input power 701 (shown in dashed). Input power 701 flows from the third gearset 132 directly to the junction 160, and input power 701 also flows from the third gearset 132 to the junction 160 through the variator bypass clutch 126 and the fourth gearset 134. Input power 700, therefore, is reconstituted at the junction 160 and transmitted thereafter to the output shaft 112 as indicated above.

Input power 700 (designated by the solid arrows) flows from the input shaft 110 to the junction 156 and thereafter to the third gearset 132. Input power 700 flowing to the third gearset 132 is modified by the "mixing" gearset 132 such that power output from the third gearset 132 becomes input power 701 as shown in FIG. 21. Input power 700 is reconstituted as discussed below at the junction 160, and input power 700 reconstituted at the junction 160 is transmitted to the junction 158 through the junctions 163, 159, 157 and the second and fourth clutches 118, 122 as shown in FIG. 21. Input power 700 reaching the junction 158 is transmitted thereafter to the output shaft 112.

Figure 22:
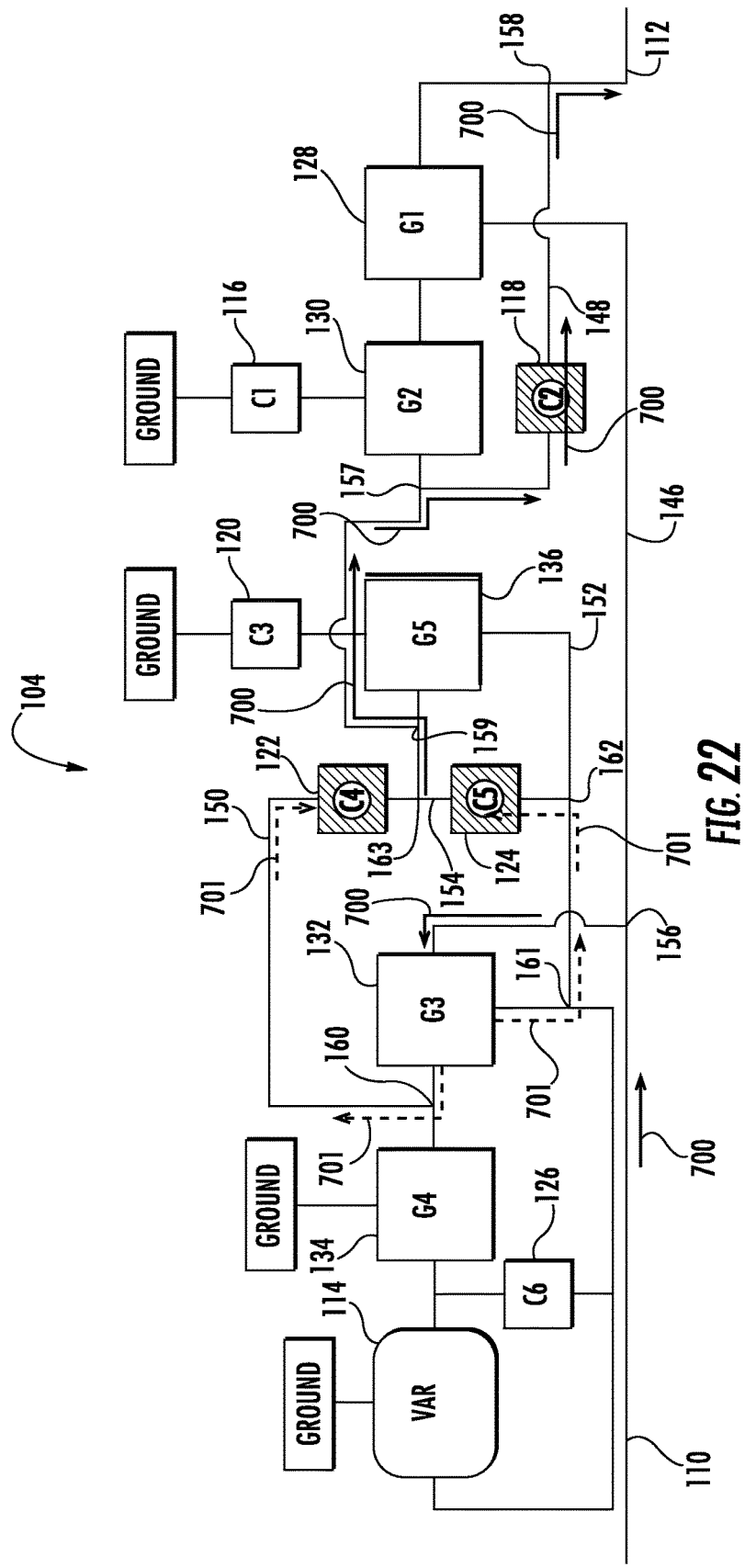
FIG. 22 is a block diagrammatic view of the infinitely variable transmission of FIG. 3 showing power flow therethrough in a fifth synchronous operating mode.

Turning now to the "Sync 5-6" mode of table 160, power flows from the input shaft 110 to the output shaft 112 of the transmission 104 as shown in FIG. 22. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows to the junction 163 through the fourth clutch 122 and some of the power flows to the junction 163 through the fifth clutch 124. From the junction 163, input power 700 flows to the junction 158 and thereafter to the output shaft 112 through the second clutch 118 and the junctions 159, 157.

As shown in FIG. 22, the power flowing from the third gearset 132 to the junction 163 is designated input power 701 (shown in dashed). Input power 701 flows from the third gearset 132 to the junction 163 through the junction 160 and the fourth clutch 122, and input power 701 also flows from the third gearset 132 to the junction 163 through the junctions 161, 162 and the fifth clutch 124. Input power 700, therefore, is reconstituted at the junction 163 and transmitted thereafter to the output shaft 112 as indicated above. The variator 114 is entirely bypassed and receives no power load in the "Sync 5-6" operating mode.

Turning now to "Mode 6" of table 160, power flows from the input shaft 110 to the output shaft 112 of the transmission 104 as shown in FIG. 23. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows directly to the junction 161 and some of the power flows to the junction 161 through the variator 114. From the junction 161, input power 700 flows to the junction 158 and thereafter to the output shaft 112 through the clutches 124, 118 and the junctions 162, 163, 159, 157.

As shown in FIG. 23, the power flowing from the third gearset 132 to the junction 161 is designated input power 701 (shown in dashed). Input power 701 flows from the third gearset 132 directly to the junction 161, and input power 701 also flows from the third gearset 132 to the junction 161 through the variator 114 and the fourth gearset 134. Input power 700, therefore, is reconstituted at the junction 161 and transmitted thereafter to the output shaft 112 as indicated above. The variator 114 is subjected only to the split power 701 flowing through the fourth gearset 134 as shown in FIG. 23.

Turning now to the "Bypass 6" mode of table 160, power flows from the input shaft 110 to the output shaft 112 of the transmission 104 as shown in FIG. 24. Input power 700 (designated by the solid arrows) flows from the input shaft 110 to the junction 156 and thereafter to the third gearset 132. Input power 700 flowing to the third gearset 132 is modified by the "mixing" gearset 132 such that some of the power that is output from the third gearset 132 flows directly to the junction 161 and some of the power flows to the junction 161 through the variator bypass clutch 126. From the junction 161, input power 700 flows to the junction 158 and thereafter to the output shaft 112 through the clutches 124, 118 and the junctions 162, 163, 159, 157.

As shown in FIG. 24, the power flowing from the third gearset 132 to the junction 161 is designated input power 701 (shown in dashed). Input power 701 flows from the third gearset 132 directly to the junction 161, and input power 701 also flows from the third gearset 132 to the junction 161 through the variator bypass clutch 126 and the fourth gearset 134. Input power 700, therefore, is reconstituted at the junction 161 and transmitted thereafter to the output shaft 112 as indicated above.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

The invention claimed is:

1. A transmission comprising:
   an input shaft configured to receive torque from a drive unit,
   an output shaft configured to transmit torque to a load,
   at least five planetary gearsets arranged between the input shaft and the output shaft,
   a variable-ratio unit arranged between the input shaft and the output shaft, and
   at least five clutches arranged between the input shaft and the output shaft, the at least five clutches being selectively engageable in combination with one another to select one of a plurality of operating modes including at least one reverse mode in which torque output by the output shaft has one direction, at least five forward modes in which torque output by the output shaft has another direction opposite the one direction, and at least five transition modes,
   wherein (i) one of the at least five transition modes is configured to transition the transmission from the at least one reverse mode to one of the at least five forward modes, (ii) another one of the at least five transition modes is configured to transition the transmission from the one of the at least five forward modes to another of the at least five forward modes, and (iii) each of the at least five transition modes includes a fixed speed ratio defined between the input shaft and the output shaft.

2. The transmission of claim 1, wherein (i) the at least five planetary gearsets comprise only five planetary gearsets and (ii) the at least five clutches comprise only five clutches.

3. The transmission of claim 1, wherein (i) the at least one reverse mode comprises only one reverse mode, (ii) the at least five forward modes comprise only five forward modes, and (iii) the at least five transition modes comprise only five transition modes.

4. The transmission of claim 1, wherein the transmission is configured to engage at least three of the at least five clutches in each of the at least five transition modes.

5. The transmission of claim 4, wherein the at least three clutches comprise only three clutches.

6. The transmission of claim 4, wherein the transmission is configured to engage at least two of the at least five clutches in each of (i) the at least one reverse operating mode and (ii) the at least five forward operating modes.

7. The transmission of claim 6, wherein the at least two clutches comprise only two clutches.

8. The transmission of claim 1, wherein (i) the transmission is operable to provide a first plurality of input speeds at the input shaft and a second plurality of output speeds at the output shaft, and (ii) the plurality of operating modes includes at least one mode in which one of the second plurality of output speeds is equal to zero for the first plurality of input speeds.

9. The transmission of claim 8, wherein the plurality of operating modes includes three modes in which one of the second plurality of output speeds is equal to zero for the first plurality of input speeds.

10. The transmission of claim 1, wherein (i) the variable-ratio unit has an input and an output, and (ii) the input of the variable-ratio unit is coaxial with the output of the variable-ratio unit.

11. The transmission of claim 10, wherein when the transmission receives torque from the drive unit, the angular velocity of the input of the variable-ratio unit has the same direction as the angular velocity of the output of the variable-ratio unit.

12. A transmission comprising:
   a housing,
   an input shaft configured to receive torque from a drive unit,
   an output shaft configured to transmit torque to a load,
   a variable-ratio unit arranged between the input shaft and the output shaft, the variable-ratio unit being configured to output torque from an input of the variable-ratio unit to an output of the variable-ratio unit,
   at least five planetary gearsets arranged between the input shaft and the output shaft, the at least five planetary gearsets including (i) a first planetary gearset coupled to the input shaft and the variable-ratio unit and (ii) a second planetary gearset coupled to the first planetary gearset, the variable-ratio unit, and the housing, and
   at least five clutches arranged between the input shaft and the output shaft, the clutches being selectively engageable in combination with one another to select one of a plurality of operating modes including at least one reverse mode in which torque output by the output shaft has one direction and at least five forward modes in which torque output by the output shaft has another direction opposite the one direction.

13. The transmission of claim 12, wherein the input of the variable-ratio unit is coaxial with the output of the variable-ratio unit.

14. The transmission of claim 12, wherein each of the first and second planetary gearsets includes an idler gear.

15. The transmission of claim 12, wherein (i) a ring gear of the first planetary gearset is coupled to the input shaft, and (ii) a carrier of the first planetary gearset is coupled to the input of the variable-ratio unit.

16. The transmission of claim 12, wherein (i) a ring gear of the second planetary gearset is coupled to a sun gear of the first planetary gearset, (ii) a sun gear of the second planetary gearset is coupled to the output of the variable-ratio unit, and (iii) a carrier of the second planetary gearset is coupled to the housing.

17. The transmission of claim 12, wherein a third planetary gearset of the at least five planetary gearsets is coupled to (i) the output shaft and (ii) the first planetary gearset.

18. The transmission of claim 12, wherein (i) a carrier of a third planetary gearset of the at least five planetary gearsets is coupled to the output shaft, and (ii) a sun gear of the third planetary gearset is coupled to a ring gear of the first planetary gearset through the input shaft.

19. The transmission of claim 12, wherein a ring gear of a third planetary gearset of the at least five planetary gearsets is coupled to a ring gear of a fourth planetary gearset of the at least five planetary gearsets.

20. A transmission comprising:
   an input shaft configured to receive torque from a drive unit,
   an output shaft configured to transmit torque to a load,
   at least five planetary gearsets arranged between the input shaft and the output shaft,
   a variable-ratio unit arranged between the input shaft and the output shaft, and
   at least five clutches arranged between the input shaft and the output shaft, the at least five clutches being selectively engageable in combination with one another to select one of a plurality of operating modes including at least one continuously-variable reverse mode in which torque output by the output shaft has one direction, at least five continuously-variable forward modes in which torque output by the output shaft has another direction opposite the one direction, and at least five transition modes configured to transition the transmission from the at least one continuously-variable reverse mode to one of the at least five continuously-variable forward modes and from the one of the at least five continuously-variable forward modes to another of the at least five continuously-variable forward modes, wherein the transmission is configured to provide (i) a range of speed ratios defined between the input shaft and the output shaft in each of the at least one continuously-variable reverse mode and the at least five continuously-variable forward modes, and (ii) a fixed speed ratio defined between the input shaft and the output shaft in each of the at least five transition modes, the range of speed ratios defined in each of the at least one continuously-variable reverse mode and the at least five continuously-variable forward modes overlapping with the fixed speed ratio defined in one of the at least five transition modes.

\* \* \* \* \*